(12) United States Patent
Zhang et al.

(10) Patent No.: US 11,687,098 B2
(45) Date of Patent: Jun. 27, 2023

(54) VEHICLE ALTITUDE RESTRICTIONS AND CONTROL

(71) Applicant: SZ DJI TECHNOLOGY CO., LTD., Shenzhen (CN)

(72) Inventors: Xingyu Zhang, Shenzhen (CN); Ketan Tang, Shenzhen (CN); Cong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 43 days.

(21) Appl. No.: 17/516,277

(22) Filed: Nov. 1, 2021

(65) Prior Publication Data

US 2022/0057813 A1 Feb. 24, 2022

Related U.S. Application Data

(63) Continuation of application No. 16/275,986, filed on Feb. 14, 2019, now Pat. No. 11,163,318, which is a
(Continued)

(51) Int. Cl.
*G05D 1/04* (2006.01)
*G01C 5/00* (2006.01)
(Continued)

(52) U.S. Cl.
CPC ............ *G05D 1/042* (2013.01); *B64C 39/024* (2013.01); *B64D 45/00* (2013.01); *B64D 47/08* (2013.01);
(Continued)

(58) Field of Classification Search
CPC ...... G05D 1/042; G05D 1/005; B64C 39/024; B64D 45/00; B64D 47/08; G01C 5/00
(Continued)

(56) References Cited

U.S. PATENT DOCUMENTS 5,445,021 A 8/1995 Catioen et al.
5,638,282 A 6/1997 Chazelle et al.
(Continued)

FOREIGN PATENT DOCUMENTS

CN 1892723 A 1/2007
CN 101036093 A 9/2007
(Continued)

OTHER PUBLICATIONS

Zhi et al., "Coordinated Landing Control of Unmanned Aerial Vehicle," 2011, Publisher: IEEE.*
(Continued)

*Primary Examiner* — Tuan C To
(74) *Attorney, Agent, or Firm* — Anova Law Group, PLLC

(57) ABSTRACT

An unmanned aerial vehicle (UAV) includes a vehicle body, one or more propulsion units coupled to the vehicle body and configured to effect movement of the UAV, and one or more processors coupled to the one or more propulsion units and individually or collectively configured to receive one or more sets of altitude restrictions for the UAV, receive location information indicating a current location of the UAV, determine a priority of the one or more sets of altitude restrictions by which the UAV abides based on the location information, select a set from the one or more sets of altitude restrictions based on the determined priority, and generate control signals to control the one or more propulsion units such that the UAV is operated in compliance with the selected set of altitude restrictions.

20 Claims, 17 Drawing Sheets

Related U.S. Application Data continuation of application No. 15/353,228, filed on Nov. 16, 2016, now Pat. No. 10,216,197, which is a continuation of application No. 15/214,023, filed on Jul. 19, 2016, now Pat. No. 9,501,060, which is a continuation of application No. PCT/CN2014/096056, filed on Dec. 31, 2014.

(51) Int. Cl.
| | |
|---|---|
| G05D 1/10 | (2006.01) |
| B64C 39/02 | (2023.01) |
| B64D 45/00 | (2006.01) |
| B64D 47/08 | (2006.01) |
| G05D 1/00 | (2006.01) |

(52) U.S. Cl.
CPC .............. *G01C 5/00* (2013.01); *G05D 1/005* (2013.01); *G05D 1/106* (2019.05)

(58) Field of Classification Search
USPC .................................................. 701/9
See application file for complete search history.

(56) References Cited

U.S. PATENT DOCUMENTS

| | | | |
|---|---|---|---|
| 6,216,064 B1 | 4/2001 | Johnson et al. | |
| 7,095,364 B1 | 8/2006 | Rawdon et al. | |
| 7,120,540 B2 | 10/2006 | Meunier | |
| 7,418,320 B1 | 8/2008 | Bodin et al. | |
| 7,634,335 B2 | 12/2009 | Bitar et al. | |
| 7,693,617 B2 | 4/2010 | Dockter et al. | |
| 7,725,220 B2* | 5/2010 | Petrich ................ G01C 5/005 | |
| | | | 701/4 |
| 7,825,851 B2* | 11/2010 | Vacanti ................ G01S 13/882 | |
| | | | 342/120 |
| 8,044,842 B2* | 10/2011 | Thomas ............... G01S 13/882 | |
| | | | 342/120 |
| 3,082,102 A1 | 12/2011 | Ravenscroft | |
| 8,543,265 B2 | 9/2013 | Ekhaguere | |
| 8,594,918 B2 | 11/2013 | Meyer-Ebeling et al. | |
| 8,725,322 B2* | 5/2014 | Botargues ............ G05D 1/0688 | |
| | | | 701/16 |
| 8,755,954 B1 | 6/2014 | McCusker et al. | |
| 8,909,391 B1 | 12/2014 | Peeters et al. | |
| 9,081,094 B2* | 7/2015 | Holt ....................... G01S 13/882 | |
| 9,221,538 B2 | 12/2015 | Takahashi et al. | |
| 9,501,060 B1 | 11/2016 | Zhang et al. | |
| 9,574,877 B2* | 2/2017 | Sasaki .................... G01C 5/06 | |
| 9,720,077 B1* | 8/2017 | Sarpoolaki ............ G01S 13/882 | |
| 9,747,809 B2 | 8/2017 | Levien et al. | |
| 9,783,293 B2 | 10/2017 | Srivastava et al. | |
| 9,905,134 B2 | 2/2018 | Kube et al. | |
| 2002/0013718 A1 | 1/2002 | Cornwell | |
| 2005/0049763 A1 | 3/2005 | Walsdorf et al. | |
| 2008/0033604 A1* | 2/2008 | Margolin ............. G05D 1/0044 | |
| | | | 701/2 |
| 2008/0065275 A1 | 3/2008 | Vizzini | |
| 2009/0132103 A1 | 5/2009 | Marty et al. | |
| 2009/0210109 A1 | 8/2009 | Ravenscroft | |
| 2010/0023187 A1 | 1/2010 | Gannon et al. | |
| 2010/0292871 A1 | 11/2010 | Schultz et al. | |
| 2011/0130913 A1 | 6/2011 | Duggan et al. | |
| 2011/0301783 A1 | 12/2011 | Goossen | |
| 2012/0123628 A1 | 5/2012 | Duggan et al. | |
| 2013/0060405 A1 | 3/2013 | Komatsuzaki et al. | |
| 2013/0211656 A1 | 8/2013 | An et al. | |
| 2013/0282209 A1 | 10/2013 | Murphy | |
| 2014/0017992 A1 | 1/2014 | Bigras et al. | |
| 2014/0018979 A1 | 1/2014 | Goossen et al. | |
| 2014/0192193 A1 | 7/2014 | Zufferey et al. | |
| 2014/0195150 A1 | 7/2014 | Rios | |
| 2014/0197985 A1 | 7/2014 | Uensen et al. | |
| 2014/0249692 A1 | 9/2014 | Levien et al. | |
| 2014/0288813 A1 | 9/2014 | Levien et al. | |
| 2014/0303884 A1 | 10/2014 | Levien et al. | |
| 2014/0324253 A1 | 10/2014 | Duggan et al. | |
| 2015/0158598 A1 | 6/2015 | You | |
| 2015/0268048 A1* | 9/2015 | Seastrand ............... G01C 21/20 | |
| | | | 701/528 |
| 2015/0294573 A1* | 10/2015 | Conner ................ G08G 5/0013 | |
| | | | 701/408 |
| 2015/0298821 A1* | 10/2015 | Ishihara ............... G08G 5/0021 | |
| | | | 701/18 |
| 2015/0336668 A1* | 11/2015 | Pasko .................... G06Q 10/00 | |
| | | | 701/2 |
| 2015/0336669 A1 | 11/2015 | Kantor et al. | |
| 2016/0125740 A1 | 5/2016 | Pasko et al. | |
| 2016/0196525 A1 | 7/2016 | Kantor et al. | |
| 2016/0217694 A1 | 7/2016 | Balta et al. | |
| 2016/0247404 A1 | 8/2016 | Srivastava et al. | |
| 2018/0253110 A1 | 9/2018 | Tate | |
| 2018/0356816 A1 | 12/2018 | McLean et al. | |

FOREIGN PATENT DOCUMENTS

| | | | | |
|---|---|---|---|---|
| CN | 101176133 A | 5/2008 | | |
| CN | 101228490 A | 7/2008 | | |
| CN | 201429796 Y | 3/2010 | | |
| CN | 102289230 A | 12/2011 | | |
| CN | 102442424 A | 5/2012 | | |
| CN | 102508492 A | 6/2012 | | |
| CN | 102541065 A | 7/2012 | | |
| CN | 102541066 A | 7/2012 | | |
| CN | 202345910 U | 7/2012 | | |
| CN | 103257348 A | 8/2013 | | |
| CN | 103287581 A | 9/2013 | | |
| CN | 103661963 A | 3/2014 | | |
| CN | 103703498 A | 4/2014 | | |
| CN | 104049636 A | 9/2014 | | |
| CN | 104217617 A | 12/2014 | | |
| CN | 104238580 A | 12/2014 | | |
| EP | 1854666 B1 | 12/2013 | | |
| EP | 2685336 A1 | 1/2014 | | |
| EP | 1906325 A3 | 4/2014 | | |
| GB | 2504132 A | 1/2014 | | |
| JP | H0672390 A | 3/1994 | | |
| JP | H08273100 A | 10/1996 | | |
| JP | H10203490 A | 8/1998 | | |
| JP | 2006121997 A | 5/2006 | | |
| JP | 2014040231 A | 3/2014 | | |
| JP | 2014137375 A | 7/2014 | | |
| JP | 2014159268 A | 9/2014 | | |
| JP | 2017523742 A | 8/2017 | | |
| JP | 2017202820 A | 11/2017 | | |
| KR | 20100042710 A | 4/2010 | | |
| WO | 9932850 A1 | 7/1999 | | |
| WO | 2009091431 A1 | 7/2009 | | |
| WO | WO-2012054533 A1 * | 4/2012 | ......... | G01C 21/3446 |
| WO | 2014068982 A1 | 5/2014 | | |
| WO | 2016154551 A1 | 9/2016 | | |

OTHER PUBLICATIONS

Ron T. Ogan, "Integration of Manned and Unmanned Aircraft Systems into U.S. Airspace," 2014, Publisher: IEEE.*
Jianjun et al., "The Design and Analysis of the Unmanned Aerial Vehicle Navigation and Altimeter," 2008, Publisher: IEEE.*
The European Patent Office (EPO) European Search Report and Search Opinion for Application149092777 dated May 9, 2017.
The World Intellectual Property Organization (WIPO) International Search Report and Written Opinion for PCTICN2014/096056 dated Sep. 29, 2015.
The United States Patent and Trademark Office (USPTO) Notice of Allowance for U.S. Appl. No. 15/214,023, filed Sep. 23, 2016.
Adan et al., "A Safety Analysis of UAV Mapping Operations ," 2018, Publisher: IEEE.
Mohamad et al., "Low Altitude 3 Dimensional Surface Mapping Use for Unmanned Aerial Vehicle ," 2012, Publisher: IEEE.
Young et al., "Collision Avoidance Radar for UAV," 2006, Publisher: IEEE.

(56) References Cited

OTHER PUBLICATIONS

Yasunori Sugawara, et al., Altitude Control Using Limited Pole Placement on Coaxial-Helicopter, 2014 IEEE 13th International Workshop on Advanced Motion Control (AMC), Jun. 2014.

Zhizhong Gong, The Maximum Height Application in Flight, Civil Aviation Economy and Technology, Nov. 1997.

Yuting He, Eslablishmenl of Ihe Safe-Service-Envelope for Aircraft, Journal of Air Force Engineering Universily (Nalural Science Edilion), Apr. 2010, vol. 11, No. 2.

Khairil et al., "Assessment of Low Altitude Aerial Data for Large Scale Urban Environmental Mapping," 2013, Publisher: IEEE.

\* cited by examiner

VEHICLE ALTITUDE RESTRICTIONS AND CONTROL

CROSS-REFERENCE

This application is a continuation of U.S. application Ser. No. 16/275,986, filed on Feb. 14, 2019, which is a continuation of U.S. application Ser. No. 15/353,228, filed on Nov. 16, 2016, now U.S. Pat. No. 10,216,197, which is a continuation of U.S. application Ser. No. 15/214,023, filed on Jul. 19, 2016, now U.S. Pat. No. 9,501,060, which is a continuation of International Application No. PCT/CN2014/096056, filed on Dec. 31, 2014, the entire contents of all of which are incorporated herein by reference.

BACKGROUND OF THE DISCLOSURE

Aerial vehicles such as unmanned aerial vehicles (UAVs) can be used for performing surveillance, reconnaissance, and exploration tasks for military and civilian applications. Such vehicles may carry a payload configured to perform a specific function.

The air traffic control of every country (for example in the US, this is the FAA) has various regulations for airspace. For example, UAVs may be prohibited from flying above certain altitudes in certain jurisdictions. When a certain altitude is exceeded, a UAV's flight and safety/stability may be affected. If a remote controller fails, a UAV could continue to fly upwards, which may be dangerous.

SUMMARY OF THE DISCLOSURE

In some instances, it may be desirable to impose height restrictions or control flight of an aerial vehicle, such as an unmanned aerial vehicle (UAV), for legal compliance, enhanced user experience, and/or improved safety. However, some restrictions may be both over and under inclusive. For example, the restriction may be set at a certain altitude above a fixed level (e.g., sea level (MSL)) regardless of the terrain. This may be applicable if using a global positioning system (GPS) to measure altitude. In this case, the UAV may be able to fly only a small distance above ground level in a high altitude city (e.g. Denver) while it may be able to fly a larger distance above ground level in a low altitude city (e.g. Washington, D.C.). A relevant altitude measurement for UAVs may be the measurement above a ground level. In some jurisdictions (e.g., the U.S.), uncontrolled airspace in which UAV flight may be allowed may be measured from the ground up. Height restrictions that disregard the ground level may further fail to take into account complex terrain or large altitude gradients in a flight location. As a result of the failure to account for high altitude ground levels, complex terrains, and large altitude gradients, the UAV may encroach upon controlled airspace or fail to reach an allowed height needed for activities such as surveillance, reconnaissance, exploration, or aerial photography. Thus, a need exists for improved and dynamic height control for flight-restricted altitudes.

Systems and methods are provided for detecting and responding to flight-restricted altitudes. Relative altitudes of a UAV may be determined. This may include calculating a vertical distance between the UAV and the seal level (MSL) or local ground level. The altitude of the UAV may be compared to an altitude restriction. Based on the comparison, a flight response of the UAV may be implemented, such as allowing the UAV to ascend or descend, landing the UAV, providing time to permit the UAV to comply with altitude restrictions, forcing the UAV to comply with altitude restrictions, and/or providing an alert or warning to the user.

Thus, in one aspect, a method for controlling movement of an unmanned aerial vehicle (UAV) having one or more propulsion units is provided. The method may comprise: receiving, at one or more processors, one or more altitude restrictions for the UAV; receiving, at the one or more processors, elevation information for an area; modifying, with aid of the one or more processors, the one or more altitude restrictions based on the elevation information so as to produce one or more modified altitude restrictions; and outputting, from the one or more processors, control signals to the one or more propulsion units to cause the UAV to comply with the one or more modified altitude restrictions while moving over the area.

In some embodiments, the one or more altitude restrictions comprise a maximum altitude limit. In some embodiments, the maximum altitude limit is about 120 m above ground level. In some embodiments, modifying the one or more altitude restrictions comprises increasing or decreasing the maximum altitude limit based on the elevation information. In some embodiments, the one or more altitude restrictions comprise a minimum altitude limit. In some embodiments, the one or more altitude restrictions comprise an allowable altitude range. In some embodiments, the one or more altitude restrictions are preset prior to flight of the UAV. In some embodiments, the one or more altitude restrictions are input by a user. In some embodiments, the one or more altitude restrictions are stored in a memory operably coupled to the one or more processors. In some embodiments, the elevation information is indicative of elevation of terrain in the area. In some embodiments, the elevation information is indicative of height of one or more manmade structures or natural structures in the area. In some embodiments, receiving the elevation information comprises receiving a map of the area comprising the elevation information. In some embodiments, the map is stored in a memory operably coupled to the one or more processors. In some embodiments, the map is received prior to flight of the UAV. In some embodiments, the map is received during flight of the UAV. In some embodiments, the method further comprises: assessing a current location of the UAV; identifying a location on the map corresponding to the current location of the UAV; and using the map to obtain elevation information for the location. In some embodiments, the current location of the UAV is assessed using one or more GPS sensors carried by the UAV. In some embodiments, receiving the elevation information comprises receiving sensor data indicative of the elevation information for the area. In some embodiments, the sensor data is generated by one or more sensors carried by the UAV and configured to measure height above ground of the UAV. In some embodiments, the one or more sensors comprise an ultrasonic sensor, a synthetic aperture radar, a time of flight camera, a vision sensor, or a lidar sensor. In some embodiments, the sensor data comprises a weighted average of height above ground measurements for the UAV over a predetermined time interval. In some embodiments, the modifying step is performed during operation of the UAV.

In another aspect, a system for controlling movement of an unmanned aerial vehicle (UAV) is provided. The system may comprise a vehicle body; one or more propulsion units coupled to the vehicle body and adapted to effect movement of the UAV; and one or more processors operably coupled to the one or more propulsion units and individually or collectively configured to: receive one or more altitude restrictions for the UAV; receive elevation information for an area;

modify the one or more altitude restrictions based on the elevation information so as to produce one or more modified altitude restrictions; and output control signals to the one or more propulsion units to cause the UAV to comply with the one or more modified altitude restrictions while moving over the area.

In some embodiments, the one or more altitude restrictions comprise a maximum altitude limit. In some embodiments, the maximum altitude limit is about 120 m above ground level. In some embodiments, the one or more processors are configured to modify the one or more altitude restrictions by increasing or decreasing the maximum altitude limit based on the elevation information. In some embodiments, the one or more altitude restrictions comprise a minimum altitude limit. In some embodiments, the one or more altitude restrictions comprise an allowable altitude range. In some embodiments, the one or more altitude restrictions are preset prior to flight of the UAV. In some embodiments, the one or more altitude restrictions are input by a user. In some embodiments, the one or more altitude restrictions are stored in a memory operably coupled to the one or more processors. In some embodiments, the elevation information is indicative of elevation of terrain in the area. In some embodiments, the elevation information is indicative of height of one or more manmade structures or natural structures in the area. In some embodiments, the one or more processors are configured to receive the elevation information by receiving a map of the area comprising the elevation information. In some embodiments, the map is stored in a memory operably coupled to the one or more processors. In some embodiments, the map is received prior to flight of the UAV. In some embodiments, the map is received during flight of the UAV. In some embodiments, the one or more processors are configured to: assess a current location of the UAV; identify a location on the map corresponding to the current location of the UAV; and use the map to obtain elevation information for the location. In some embodiments, the current location of the UAV is assessed using one or more GPS sensors carried by the UAV. In some embodiments, the one or more processors are configured to receive the elevation information by receiving sensor data indicative of the elevation information for the area. In some embodiments, the sensor data is generated by one or more sensors carried by the UAV and configured to measure height above ground of the UAV. In some embodiments, the one or more sensors comprise an ultrasonic sensor, a synthetic aperture radar, a time of flight camera, a vision sensor, or a lidar sensor. In some embodiments, the sensor data comprises a weighted average of height above ground measurements for the UAV over a predetermined time interval. In some embodiments, the one or more processors are configured to modify the one or more altitude restrictions during operation of the UAV.

In another aspect, a method for controlling movement of an unmanned aerial vehicle (UAV) having one or more propulsion units is provided. The method may comprise: receiving, at one or more processors, one or more altitude restrictions for the UAV; receiving, at the one or more processors, map information for an area; modifying, with aid of the one or more processors, the one or more altitude restrictions based on the map information so as to produce one or more modified altitude restrictions; and outputting, from the one or more processors, control signals to the one or more propulsion units to cause the UAV to comply with the one or more modified altitude restrictions while moving over the area.

In some embodiments, the one or more altitude restrictions comprise a maximum altitude limit. In some embodiments, the maximum altitude limit is about 120 m above ground level. In some embodiments, modifying the one or more altitude restrictions comprises increasing or decreasing the maximum altitude limit based on the map information. In some embodiments, the one or more altitude restrictions comprise a minimum altitude limit. In some embodiments, the one or more altitude restrictions comprise an allowable altitude range. In some embodiments, the one or more altitude restrictions are preset prior to flight of the UAV. In some embodiments, the one or more altitude restrictions are input by a user. In some embodiments, the one or more altitude restrictions are stored in a memory operably coupled to the one or more processors. In some embodiments, the map information comprises elevation information for the area. In some embodiments, the elevation information is indicative of elevation of terrain in the area. In some embodiments, the elevation information is indicative of height of one or more manmade structures or natural structures in the area. In some embodiments, the map information comprises locations of restricted airspaces. In some embodiments, the restricted airspaces comprise one or more of an airport, an urban area, a military installation, or an environmental conservation area. In some embodiments, receiving the map information comprises receiving a map of the area comprising the map information. In some embodiments, the map is a topographical map. In some embodiments, the map is stored in a memory operably coupled to the one or more processors. In some embodiments, the map is received prior to flight of the UAV. In some embodiments, the map is received during flight of the UAV. In some embodiments, the method further comprises: assessing a current location of the UAV; identifying a location on the map corresponding to the current location of the UAV; and using the map to obtain map information for the location. In some embodiments, the current location of the UAV is assessed using one or more GPS sensors carried by the UAV. In some embodiments, the modifying step is performed during operation of the UAV.

In another aspect, a system for controlling movement of an unmanned aerial vehicle (UAV) is provided. The system may comprise: a vehicle body; one or more propulsion units coupled to the vehicle body and adapted to effect movement of the UAV; and one or more processors operably coupled to the one or more propulsion units and individually or collectively configured to: receive one or more altitude restrictions for the UAV; receive map information for an area; modify the one or more altitude restrictions based on the map information so as to produce one or more modified altitude restrictions; and output control signals to the one or more propulsion units to cause the UAV to comply with the one or more modified altitude restrictions while moving over the area.

In some embodiments, the one or more altitude restrictions comprise a maximum altitude limit. In some embodiments, the maximum altitude limit is about 120 m above ground level. In some embodiments, the one or more processors are configured to modify the one or more altitude restrictions by increasing or decreasing the maximum altitude limit based on the map information. In some embodiments, the one or more altitude restrictions comprise a minimum altitude limit. In some embodiments, the one or more altitude restrictions comprise an allowable altitude range. In some embodiments, the one or more altitude restrictions are preset prior to flight of the UAV. In some embodiments, the one or more altitude restrictions are input by a user. In some embodiments, the one or more altitude restrictions are stored in a memory operably coupled to the one or more processors. In some embodiments, the map information comprises elevation information for the area. In some embodiments, the elevation information is indicative of elevation of terrain in the area. In some embodiments, the elevation information is indicative of height of one or more manmade structures or natural structures in the area. In some embodiments, the map information comprises locations of restricted airspaces. In some embodiments, the restricted airspaces comprise one or more of an airport, an urban area, a military installation, or an environmental conservation area. In some embodiments, the one or more processors are configured to receive the map information by receiving a map of the area comprising the map information. In some embodiments, the map is a topographical map. In some embodiments, the map is stored in a memory operably coupled to the one or more processors. In some embodiments, the map is received prior to flight of the UAV. In some embodiments, the map is received during flight of the UAV. In some embodiments, the one or more processors are configured to: assess a current location of the UAV; identify a location on the map corresponding to the current location of the UAV; and use the map to obtain map information for the location. In some embodiments, the current location of the UAV is assessed using one or more GPS sensors carried by the UAV. In some embodiments, the one or more processors are configured to modify the one or more altitude restrictions during operation of the UAV.

In another aspect, a method for controlling movement of an unmanned aerial vehicle (UAV) having one or more propulsion units is provided. The method may comprise: (a) outputting, from one or more processors, control signals to the one or more propulsion units to cause UAV to operate according to a first set of altitude restrictions, wherein the first set of altitude restrictions constrain altitude of the UAV relative to a first reference altitude; (b) assessing, with aid of the one or more processors and based on one or more criteria, whether the UAV should operate according to a second set of altitude restrictions; and (c) outputting, from the one or more processors, control signals to the one or more propulsion units to cause the UAV to operate according to the second set of altitude restrictions if the one or more criteria are fulfilled according to the assessment of (b), wherein the second set of altitude restrictions constrain altitude of the UAV relative to a second reference altitude.

In some embodiments, the first reference altitude is altitude at sea level and wherein the second reference altitude is altitude at ground level at a current location of the UAV. In some embodiments, at least one of the first or second set of altitude restrictions comprises a maximum altitude limit. In some embodiments, the maximum altitude limit is about 120 m above the first or second reference altitude. In some embodiments, at least one of the first or second set of altitude restrictions comprises a minimum altitude limit. In some embodiments, at least one of the first or second set of altitude restrictions comprises an allowable altitude range. In some embodiments, at least one of the first or second set of altitude restrictions are preset prior to flight of the UAV. In some embodiments, at least one of the first or second set of altitude restrictions are input by a user. In some embodiments, at least one of the first or second set of altitude restrictions are stored in a memory operably coupled to the one or more processors. In some embodiments, the one or more criteria comprise whether a current flight time of the UAV has exceeded a predetermined flight time threshold. In some embodiments, the predetermined flight time threshold is about 10 seconds. In some embodiments, the one or more criteria comprise whether a current altitude of the UAV has exceeded a predetermined altitude threshold. In some embodiments, the predetermined altitude threshold is about 100 m above ground level. In some embodiments, the one or more criteria comprise whether a current altitude of the UAV is greater than an altitude of an initial location of the UAV. In some embodiments, the one or more criteria comprise whether the UAV is not currently within a restricted airspace. In some embodiments, the one or more criteria comprise whether the second set of altitude restrictions are not currently prohibited by a controller for the UAV. In some embodiments, the controller is located onboard the UAV. In some embodiments, the controller is a remote control device in communication with the UAV. In some embodiments, the one or more criteria are preset prior to flight of the UAV. In some embodiments, the one or more criteria are input by a user. In some embodiments, the one or more criteria are stored in a memory operably coupled to the one or more processors.

In another aspect, a system for controlling movement of an unmanned aerial vehicle (UAV) is provided. The system may comprise: a vehicle body; one or more propulsion units coupled to the vehicle body and adapted to effect movement of the UAV; and one or more processors operably coupled to the one or more propulsion units and individually or collectively configured to: (a) output signals to the one or more propulsion units to cause the UAV to operate according to a first set of altitude restrictions, wherein the first set of altitude restrictions constrain altitude of the UAV relative to a first reference altitude; (b) assess, based on one or more criteria, whether the UAV should operate according to a second set of altitude restrictions; and (c) output signals to the one or more propulsion units to cause the UAV to operate according to the second set of altitude restrictions if the one or more criteria are fulfilled according to the assessment of (b), wherein the second set of altitude restrictions constrain altitude of the UAV relative to a second reference altitude.

In some embodiments, the first reference altitude is altitude at sea level and wherein the second reference altitude is altitude at ground level at a current location of the UAV. In some embodiments, at least one of the first or second set of altitude restrictions comprises a maximum altitude limit. In some embodiments, the maximum altitude limit is about 120 m above the first or second reference altitude. In some embodiments, at least one of the first or second set of altitude restrictions comprises a minimum altitude limit. In some embodiments, at least one of the first or second set of altitude restrictions comprises an allowable altitude range. In some embodiments, at least one of the first or second set of altitude restrictions are preset prior to flight of the UAV. In some embodiments, at least one of the first or second set of altitude restrictions are input by a user. In some embodiments, at least one of the first or second set of altitude restrictions are stored in a memory operably coupled to the one or more processors. In some embodiments, the one or more criteria comprise whether a current flight time of the UAV has exceeded a predetermined flight time threshold. In some embodiments, the predetermined flight time threshold is about 10 seconds. In some embodiments, the one or more criteria comprise whether a current altitude of the UAV has exceeded a predetermined altitude threshold. In some embodiments, the predetermined altitude threshold is about 100 m above ground level. In some embodiments, the one or more criteria comprise whether a current altitude of the UAV is greater than an altitude of an initial location of the UAV. In some embodiments, the one or more criteria comprise whether the UAV is not currently within a restricted airspace. In some embodiments, the one or more criteria comprise whether the second set of altitude restrictions are not currently prohibited by a controller for the UAV. In some embodiments, the controller is located onboard the UAV. In some embodiments, the controller is a remote control device in communication with the UAV. In some embodiments, the one or more criteria are preset prior to flight of the UAV. In some embodiments, the one or more criteria are input by a user. In some embodiments, the one or more criteria are stored in a memory operably coupled to the one or more processors.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Figure 1:
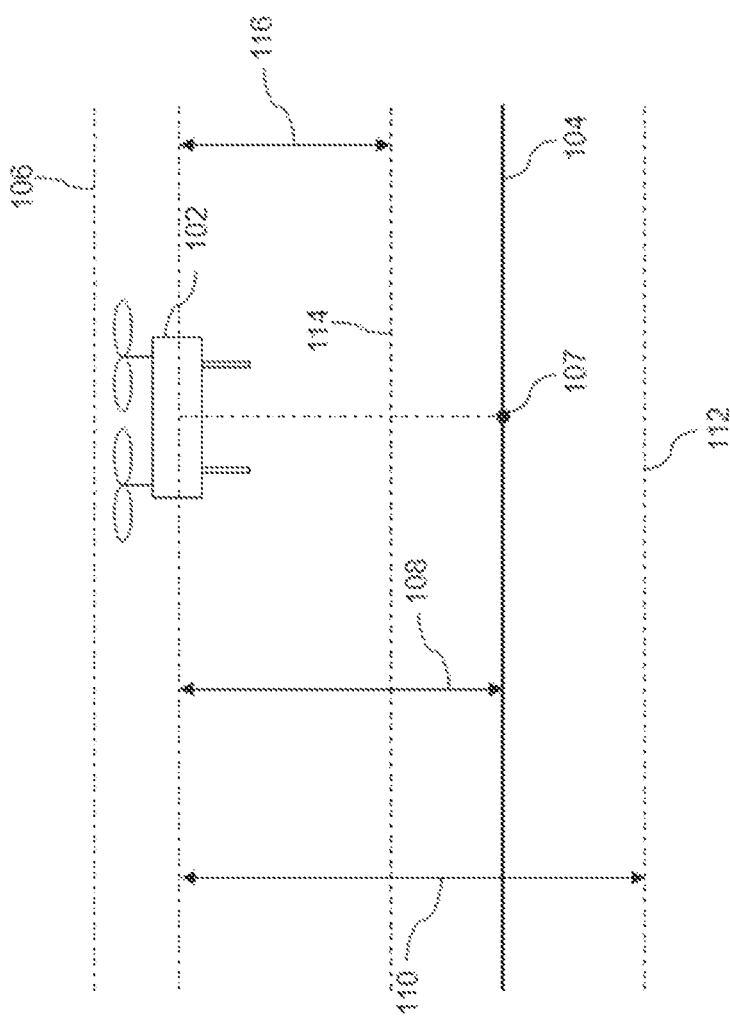
FIG. 1 provides an illustration of a UAV flying over a ground subject to an altitude restriction, in accordance with embodiments.

The systems, devices, and methods of the present disclosure provide control for an aerial vehicle in response to one or more detected flight-restricted altitudes. The aerial vehicle may be an unmanned aerial vehicle (UAV), or any other type of movable object.

It may be desirable to provide one or more flight restriction, such as an altitude restriction for an aerial vehicle, such as a UAV. When an altitude is exceeded, the UAV's flight and safety/stability may be affected or compromised. In another example, if a UAV's remote controller were to fail, the UAV may continue to fly upwards, which can be dangerous. Thus, a flight ceiling may be an advantageous feature to have for a UAV.

The aerial vehicle may be subject to various regulations for airspace. For example, in the U.S., there may be restricted altitudes in which unauthorized vehicles may not fly. This may include unauthorized UAVs or all UAVs. Flight-restricted altitudes may vary from jurisdiction to jurisdiction. Examples of jurisdictions may include, but are not limited to continents, unions, countries, states/provinces, counties, cities, towns, private property or land, or other types of jurisdictions. Therefore, providing altitude restrictions on the UAV may ensure that UAVs are in compliance with the regulations of differing jurisdictions.

Altitude restrictions on the UAV may provide additional benefits such as added safety and/or reducing the potential for nuisance-like activity. For example, by limiting the maximum altitude UAVs can navigate in, potential for UAV collision with other aerial vehicles may decrease. Additionally, minimum altitude restrictions imposed on UAVs may decrease the chances of UAVs colliding with obstacles, buildings, terrain, and/or people and reduce the potential for nuisance like activity by the UAV (e.g., noise or disturbance due to the UAV).

Providing an option for an altitude restriction may endow benefits to the operator of the UAV. For example, a UAV operator may be more comfortable with operating a UAV with altitude restrictions if having the altitude restrictions reduces the chances of collision with other aerial vehicles or objects. A UAV operator may be more comfortable with operating a UAV with altitude restrictions if having the altitude restrictions reduce the chances of UAVs being lost, damaged, and/or damaging others' properties. A UAV operator may be more comfortable with operating a UAV if having the altitude restrictions increase the chance that UAVs are in compliance with regulations of the differing jurisdictions. A UAV operator may derive greater enjoyment or utility with operating a UAV with altitude restrictions if the altitude restrictions simplify the control process (e.g., by increasing the probability that the UAV remains in controllable range at all times).

Providing altitude restrictions on the UAV may be desirable for UAV manufacturers. For example, by ensuring legal compliance, potential law suits may be reduced. By providing additional safeguards for the UAV operator, customer complaint may be reduced. Therefore, a need exists to provide an altitude restriction function to UAVs.

However, some restrictions may be both over and under inclusive. For example, the restriction may be set at a certain altitude above a fixed level (e.g., MSL) regardless of the terrain. This may be applicable if using a global positioning system (GPS) to measure altitude. In this case, the UAV may be able to fly only a small distance above ground level in a high altitude city (e.g. Denver) while it may be able to fly a larger distance above ground level in a low altitude city (e.g. Washington, D.C.).

A relevant altitude measurement for UAVs may be the measurement above a ground level. In some jurisdictions (e.g., the U.S.), uncontrolled airspace in which UAV flight may be allowed may be measured from the ground up. Height restrictions that disregard the ground level may further fail to take into account complex terrain or large altitude gradients in a flight location. As a result of the failure to account for high altitude ground levels, complex terrains, and large altitude gradients, the UAV may encroach upon controlled airspace or fail to reach an allowed height needed for activities such as surveillance, reconnaissance, exploration, or aerial photography. Thus, a need exists for improved and dynamic height control for flight-restricted altitudes.

Additionally, it can be advantageous to implement dynamic altitude restrictions based on the height of objects present in the terrain (e.g., manmade structures such as buildings; natural structures such as trees or other plants) in order to allow the UAV to fly at a sufficiently high altitude in order to avoid safety incidents such as collisions with the objects. This can be beneficial when operating in regions where tall structures are present (e.g., urban areas with skyscrapers, forested areas with extremely tall trees, etc.). Moreover, the adjustment of altitude restrictions as described herein can be beneficial for improving other types of UAV operations, such as aerial photography.

Systems and methods described herein may account for the underlying ground level and/or terrain. Thus, systems and methods provided herein may permit a varying altitude ceiling when the altitude restrictions depend on the ground level. The systems and methods provided herein may also account for different flight altitude restrictions which may be based on the MSL or the ground level. The systems and methods described herein may also control flight of the UAV to maintain the UAV within a permitted altitude range.

Although restrictions involving altitude have been discussed primarily herein, it shall be understood that the restrictions on UAV operations may include that of position (e.g., latitude, longitude, altitude), orientation (e.g., roll, pitch yaw), velocity (e.g., translational and/or angular), and/or acceleration (e.g., translational and/or angular). The different restrictions may provide different benefits to the operation of the UAV. For example, restrictions on the position may prevent UAV incursions into restricted airspaces, prevent the UAV from flying too far from a starting point, or only permit the UAV to fly within a confined space. Restriction on the orientation may prevent the UAV from assuming unstable orientations that would result in the loss of control and/or flight ability. Restrictions on the acceleration or velocity may also prevent the UAV from assuming unstable movements that would result in the loss of control and/or flight ability.

FIG. 1 illustrates a UAV 102 flying over a ground 104 subject to an altitude restriction 106, in accordance with embodiments. Although various embodiments herein are described with respect to operation of UAVs over ground, it shall be understood that the present disclosure can also be applied to operation of UAVs over all types of terrain and surfaces (e.g., water, mountain, dessert, plain, plateaus, jungles, and artificial). The UAV can be controlled to fly within various altitudes. Altitude may be used herein to refer to the vertical distance between the UAV and a reference point or level. Examples of reference levels include ground level, sea level (i.e., mean sea level), average terrain level, geoid level, and the like. Ground level may indicate an underlying surface of the earth. The surface of an object grounded in the floor may be ground level. In some examples, a surface of an asphalt road may be ground level, a top of a building may be ground level, a surface of a big boulder on top of a mountain range may be ground level. Optionally, ground level may refer to any underlying surface beneath a UAV. Alternatively, ground level may refer to major terrain contours without including small deviations from the terrain. For example, ground level may refer to the underlying earth, mountains, hills, valleys, without including manmade buildings or structures, or smaller naturally occurring features (e.g., trees, boulders, bushes). For example, in a city, the streets may be considered to be at ground level while the buildings are not. Ground level may refer to a local ground level of an area that the UAV is in. The local ground level may be a ground surface at a point which the UAV is directly above. FIG. 1 shows a ground level 104 that is uniform around a local ground level 107. "Absolute altitude" 108 may be used herein to refer to the vertical distance between the UAV and the local ground level. "True altitude" 110 may be used herein to refer to the vertical distance between the UAV and mean sea level (MSL) 112.

The UAV may be subject to one or more altitude restrictions. The altitude restrictions may be preset prior to flight of the UAV. The altitude restrictions may be updated while the UAV is turned off. The altitude restrictions may be updated before the UAV takes off. The altitude restrictions may be updated while the UAV is in flight. The altitude restrictions may be stored in a memory operably coupled to a processor on or off board the UAV. The altitude restrictions may be downloaded from a router, from a cloud server, from an external device, or other server. The UAV may be subject to a maximum altitude limit, or "ceiling," which the UAV cannot fly above. The ceiling may be about or below 10,000 m, 5,000 m, 2,000 m, 1,000 m, 500 m, 200 m, 140 m, 120 m, 100 m, 80 m, 60 m, 50 m, 40 m, 30 m, 20 m, 10 m, or 5 m. The UAV may be subject to a minimum altitude, or "floor," which the UAV cannot fly below. The floor may be about or above 1 m, 2 m, 3 m, 4 m, 5 m, 7 m, 10 m, 20 m, 40 m, 100 m, or 200 m. The UAV may be subject to an allowable altitude range in which it must operate within. The allowable altitude range may be a combination of the minimum and maximum altitude restrictions mentioned herein. For example, the allowable altitude range may be above 2 m but below 140 m. The altitude restrictions may be expressed relative to a reference level such as "absolute altitude" and "true altitude" mentioned herein. FIG. 1 shows the UAV 102 subject to an altitude ceiling 106 and an altitude floor 114 and allowed to navigate in the altitude range 116. The altitude ceiling 106 and altitude floor 114 may be relative to a ground level 104, MSL 112, or any other reference level mentioned herein.

The UAV may be subject to one or more altitude ceilings and/or one or more altitude floors. For example, the UAV may have altitude restrictions having to do with the laws of the jurisdiction which it is operating in, altitude restrictions set forth by the UAV manufacturer (e.g., preconfigured or downloaded), and/or altitude restrictions set forth by a UAV operator (a user). The user may input their own restrictions based on their preference. The user may input the restrictions in a user interface (e.g., remote controller, hand-held device, and computer). The preferences can be sent to a flight controller to limit the operation of the UAV. The user may be prevented from inactivating or overriding some altitude restrictions in certain circumstances (e.g. legally required).

Each of the altitude restrictions may have an altitude ceiling and/or an altitude floor. When a UAV has multiple altitude ceilings and/or altitude floors, there may be a priority of altitude restrictions that the UAV follows. The UAV may give priority to altitude restrictions having to do with the laws of the jurisdiction which it is operating in. The UAV may give priority to altitude restrictions set forth by the manufacturer. The UAV may give priority to altitude restrictions set forth by a UAV operator. Priorities of altitude restrictions may change depending on the location of the UAV. For example, near an airport, the altitude restrictions set forth by the manufacturer may take priority over altitude restrictions set forth by the UAV operator. Further away from an airport, altitude restrictions set forth by the UAV operator may take priority over altitude restrictions set forth by the UAV manufacturer. Priority may be set such that the UAV operates under one altitude restriction amongst competing altitude restrictions (e.g., user set altitude restrictions). Priority may be set such that the UAV follows a hierarchy of altitude restrictions (e.g., user set altitude restrictions get priority over manufacturer altitude restrictions as long as the UAV is operating within the jurisdictional altitude restrictions). Priority may be set such that the UAV operates under the safest conditions (e.g., abide by the highest altitude floor from the restrictions and lowest altitude ceiling from the restrictions). Priority may be set such that The UAV operates with the most freedom (e.g., abide by the highest altitude ceiling and lowest altitude floor).

The altitude restrictions may or may not depend on the location of the UAV. For example, the priorities of the altitude restrictions may change as mentioned herein. Further, the jurisdictional altitude restrictions may change (e.g., near an airport). Further, the manufacturer set altitude restrictions may change (e.g., higher altitude restriction in countryside but lower altitude restriction in the vicinity of cities). The information regarding altitude restrictions and locations where altitude restrictions are in particular effect may be stored on-board the UAV. Alternatively, information regarding altitude restrictions and locations where altitude restrictions are in particular effect may be accessed from a data source off-board the UAV. The information regarding altitude restrictions and locations where altitude restrictions are in particular effect may be received in various forms including, but not limited to, maps, geographical coordinates, and databases.

The location (e.g., latitude and longitude) of the UAV may be determined. The location of the UAV may be determined to any degree of specificity. For example, the location of the UAV may be determined to within about 2000 meters, 1500 meters, 1200 meters, 1000 meters, 750 meters, 500 meters, 300 meters, 100 meters, 75 meters, 50 meters, 20 meters, 10 meters, 7 meters, 5 meters, 3 meters, 2 meters, 1 meter, 0.5 meters, 0.1 meters, 0.05 meters, or 0.01 meters. This may occur prior to take-off of the UAV and/or while the UAV is in flight. In some instances, the UAV may have a GPS receiver that may be used to determine the location of the UAV. In other examples, the UAV may be in communication with an external device, such as a mobile control terminal. The location of the external device may be determined and used to approximate the location of the UAV.

An altitude of the UAV may be processed to determine if the UAV is compliant with altitude restrictions. One or more sensors (e.g., an altimeter) may be onboard the UAV to detect the altitude. A processor on-board or off-board the UAV may compare current UAV altitude values to the altitude restrictions. The comparison may take place in real time. The comparison may take place at or within every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second.

The altitude restrictions may affect the operation of the UAV in a variety of ways. Once a UAV approaches the restricted altitude, a warning may be sent to the user to alert the user of the fact. The UAV may alert the user (e.g., via mobile application, flight status indicator, audio indicator, or other indicator) regarding the close proximity of the UAV to the flight-restricted altitude. An alert can include a visual alert, audio alert, or tactile alert via an external device. The external device may be a mobile device (e.g., tablet, smartphone, remote controller) or a stationary device (e.g., computer). For example, the external device can be a smartphone or remote controller that implements a software application that provides the alert, e.g., as text, image, audio, vibration, etc. In other examples the alert may be provided via the UAV itself, e.g., via lighting or sound systems on the UAV. The alert may include a flash of light, text, image and/or video information, a beep or tone, audio voice or information, vibration, and/or other type of alert. For example, a mobile device may vibrate to indicate an alert. In another example, the UAV may flash light and/or emit a noise to indicate the alert. Such alerts may be provided in combination with other flight response measures or alone.

In the case of an altitude ceiling, the warning may be provided if the UAV is above the altitude ceiling or is at altitude below but within 0.5 m, 1 m, 2 m, 3 m, 4 m, 5 m, 7 m, 10 m, 20 m, 50 m, 100 m, or 200 m of the altitude ceiling. In the case of an altitude floor, the warning may be provided if the UAV is below the altitude floor or is at an altitude above but within 0.5 m, 1 m, 2 m, 3 m, 4 m, 5 m, 7 m, 10 m, 20 m, 50 m, 100 m, or 200 m of the altitude floor.

Alternatively or in conjunction, the altitude restrictions may prevent the UAV from flying at restricted altitudes. For example, user input instructing the UAV to fly into a restricted altitude may be ignored or modified to comply with instructions only to the extent that UAV flight is within the restrictions.

In the event that the UAV intentionally or inadvertently ends up above an altitude ceiling or below and altitude floor (e.g., user command or due to a rising air current such as a thermal column), the UAV control system may automatically affect the propulsion units of the UAV such that the UAV moves back within a permitted altitude. The automatic compliance with the altitude restrictions may happen immediately or if the UAV continues its flight in a restricted airspace for a period of time. The period of time may be about or below 10 minutes, 5 minutes, 2 minutes, 1 minute, 30 seconds, 10 seconds, 5 seconds, 2 seconds, or 1 second.

In some embodiments, the UAV may be permitted to descend beneath the altitude floor when landing. In some instances, an automated landing sequence may be engaged. Engaging the automated landing sequence may permit the UAV to descend beneath the altitude floor. In other embodiments, the UAV may be manually landed and an indication may be provided that the UAV is landing or the landing of the UAV may be inferred from one or more flight characteristics.

Altitude sensors may report back altitude measurements of an object compared to a fixed level. Examples of altitude sensors include, but are not limited to, pressure altimeters, sonic altimeters, radar altimeters, GPS, and satellites. Some altitude sensors, such as a radar altimeter, may measure altitudes that correspond to the absolute altitude. Some altitude sensors, such as a GPS, may measure altitudes that correspond to the true altitude rather than an absolute altitude. Altimeters that measure altitudes not in reference to the ground level may allow flight of the UAV that is both over and under inclusive. This may be because airspace in which UAV flight is allowed may be based on an altitude measured vertically from the ground level. In the U.S., for example, Class G airspace, in which the ATC has no authority or responsibility to control air traffic, extends from the surface to the base of the overlying Class E airspace.

Figure 16:
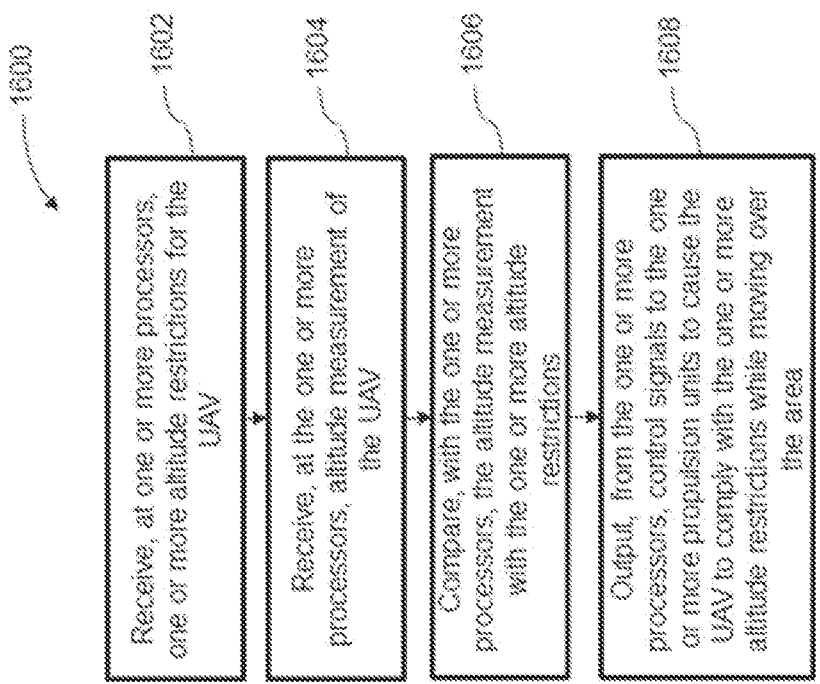
FIG. 16 illustrates a method for comparing altitude measurements of a UAV with one or more altitude restrictions, in accordance with an embodiment of the disclosure.

FIG. 16 illustrates a method 1600 for comparing altitude measurements of a UAV with one or more altitude restrictions, in accordance with embodiments. In step 1602, one or more altitude restrictions for the UAV may be received at the one or more processors of the UAV. The altitude restrictions may be received as previously described herein (e.g., from memory, user input, etc). The restrictions may be a maximum altitude, a minimum altitude, or a combination (e.g., a range). There may be a plurality of maximum altitudes (e.g., pre-programmed maximum altitude and a user input maximum altitude). There may be a plurality of minimum altitudes. A user input altitude restriction may or may not override the other altitude restrictions. The altitude restriction may or may not depend on a lateral (e.g., geography) location of the UAV. The altitude restrictions may or may not be based on absolute altitude or true altitude of the UAV, or any combination thereof.

In step 1604, the altitude measurement of the UAV may be received at the one or more processors. The altitude information may be a measurement produced by an altitude sensor mentioned herein (e.g., a GPS on board the UAV). The altitude information may be an altitude measurement made relative to a reference point mentioned herein (e.g. true altitude measurement measured relative to MSL, absolute altitude measurement measured relative to ground level). The altitude measurement may be made about or within every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second.

In step 1606, the altitude measurement of the UAV may be compared with the one or more altitude restrictions using the one or more processors. The comparison may take place about or within every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second. If the altitude measurement and the altitude restrictions are of different scales (e.g., one is relative to MSL and the other is relative to ground level), information about the underlying terrain (e.g., elevation at ground level relative to MSL) may be used to appropriately scale the altitude measurement to the altitude restriction, or vice versa. For example, if the flight restriction is 400 m above ground level, and the altitude of the UAV is measured as 500 m relative to MSL, information about the ground level elevation may be incorporated. The information about the ground level elevation can come from many sources (e.g., sensors, maps, elevation information, coordinate information, topographic information), as described further elsewhere herein. In the example, if the ground level is at 200 m above MSL, the UAV is found to be at 300 m above ground level, and still within a permitted flight altitude.

In step 1608, control signals may be output from the one or more processors to the one or more propulsion units to cause the UAV to comply with the one or more altitude restrictions while moving over the area. If the UAV is in compliance with the one or more altitude restrictions, there may be no reason to output control signals and step 1608 may be optional. If the UAV is in compliance with the one or more altitude restrictions but is in close proximity to the altitude restrictions (e.g., within 0.5 m, 1 m, 2 m, 3 m, 4 m, 5 m, 7 m, 10 m, 20 m, 50 m, 100 m, or 200 m of the altitude restriction), controls signals may be output such that the UAV moves further away from the restricted altitude or such that the UAV is rendered incapable of moving closer to the restricted altitude. As an alternative or supplement to step 1608, an alert or warning described herein may be issued instead. The control signal may affect operation of the UAV immediately after the comparison is made or if the UAV continues its flight in a restricted altitude for a period of time. The period of time may be about or below 10 minutes, 5 minutes, 2 minutes, 1 minute, 30 seconds, 10 seconds, 5 seconds, 2 seconds, or 1 second.

If UAV altitude restrictions are provided relative to ground level but altitude measurements are relative to a different reference level (e.g. MSL), operation of the UAV may be unnecessarily restricted. For example, in a high altitude city (e.g., Denver), the UAV may be prevented from flight altogether or if allowed to fly, may be allowed only to fly a limited amount over the ground, less than what is legally allowed. This may disable the UAV from properly navigating its flight area and reaching a height that may be necessary for UAV activities such as surveillance, reconnaissance, exploration, and aerial photography.

Additionally, if UAV altitude restrictions are provided relative to ground level but altitude measurements are relative to a different reference level (e.g. MSL), operation of the UAV may inadvertently be within restricted airspace, which may be illegal. For example, in a low altitude city (e.g., Washington, D.C.), the UAV may be allowed to fly in restricted airspace despite the altitude restrictions. This can lead to negative legal ramifications and/or lead to safety problems (e.g. collision with aerial vehicles operating under the supervision and authority of the ATC).

Furthermore, altitude measurements that do not rely on a ground level may fail to take into account complex terrain or large altitude gradients in a flight location. For example, even in a low altitude city, the UAV may be restricted from reaching a legally allowed height necessary to explore a high mountain range in order for properly carrying out its aforementioned activities. As a result of the failure to account for the altitude of the local ground levels, complex terrains, and large altitude gradients, the UAV may encroach upon controlled airspace or fail to reach an allowed height needed for activities such as surveillance, reconnaissance, exploration, or aerial photography.

Figure 2:
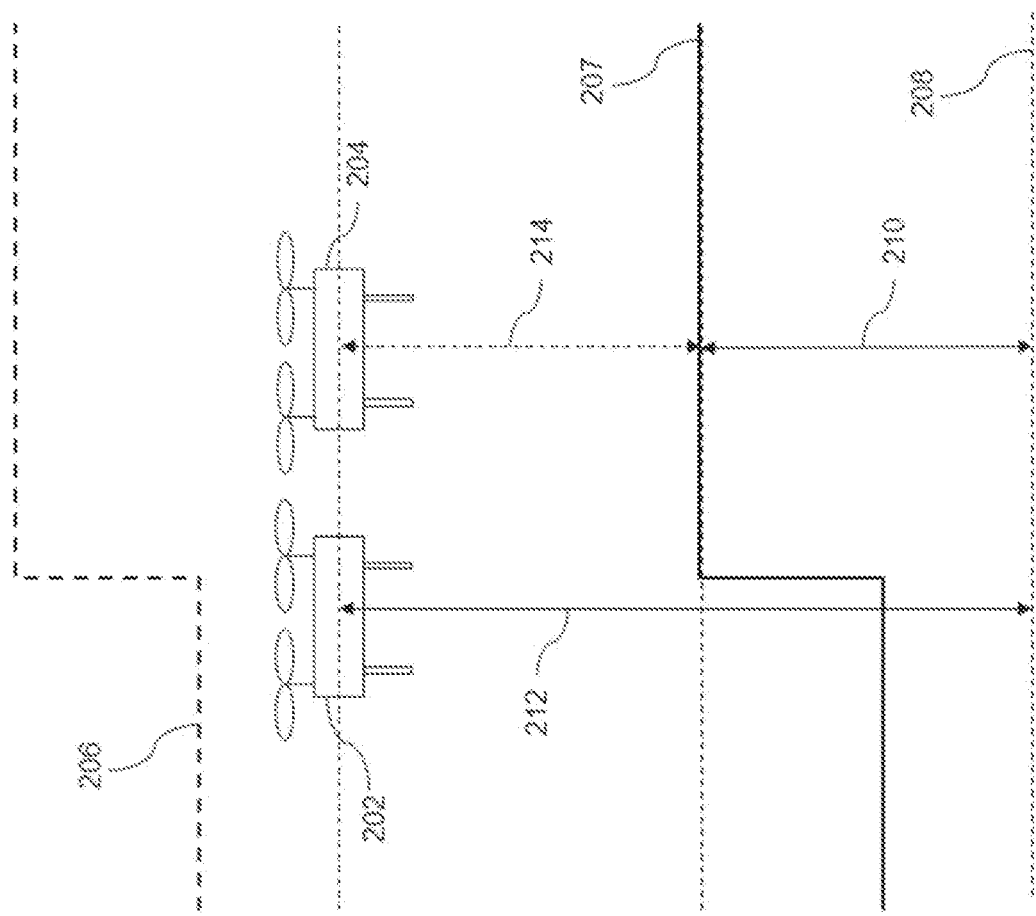
FIG. 2 provides an illustration of a UAV dynamically processing altitude measurements which are compared to a maximum altitude restriction, in accordance with embodiments.

FIG. 2 illustrates a single UAV at time points T1 202 and T2 204 dynamically processing its altitude measurements which is compared to the maximum altitude restriction 206, in accordance with embodiments. The altitude restriction 206 is constant relative to the ground level 207 while the altitude of the UAV is constant relative to the MSL 208. The two values may not be compared properly because their respective reference altitudes are different. Altitude measurements of the UAV may be dynamically processed during the operation of the UAV to account for local terrain elevation. An elevation information and/or map information of the UAV's flight area may be stored on-board the UAV or accessed from a data source off-board the UAV. The map information may include elevation information of the UAV's flight area. For instance, elevation at each point on a map or selected features on a map may be provided. The elevation information on a map may include ground level elevation information. In some instances, elevation information may be provided separately from a map. For example, geographic coordinates may be provided with elevation information at each coordinate. The map information or elevation information may be stored in a memory operably coupled to one or more processors. The map information or elevation information may be loaded in advance (before flight) or in real time while in flight. The map information or the elevation information may or may not be indicative of the height of manmade and/or natural structures in the area. The map information or the elevation information may be in the form of a map of the UAV flight area. The map may be a topographical map. The map may include elevation of the terrain in the area (e.g., altitude of ground compared to MSL). The map information may include information that may affect altitude restrictions of the UAV flight area (e.g., locations of restricted airspaces; locations of regions with tall manmade and/or natural structures such as cities with tall buildings, forests with tall trees).

The UAV may be located as described herein (e.g., using a GPS) and a location on the map corresponding to the location of the UAV may be identified. Further, the instant elevation, or true altitude 210 of the terrain below where the UAV is operating at T2 or near where the UAV is operating may be determined with the aid of a processor (e.g., read out from the map information or elevation information). While altitude sensors may produce altitude measurements 212 relative to a reference level different from the local terrain elevation (e.g., true altitude measured using a GPS), a processor may be able to dynamically process (e.g., during flight) the absolute altitude measurements of the UAV 214 by subtracting the instant elevation of the terrain 210 from the true altitude of UAV 212.

Figure 3:
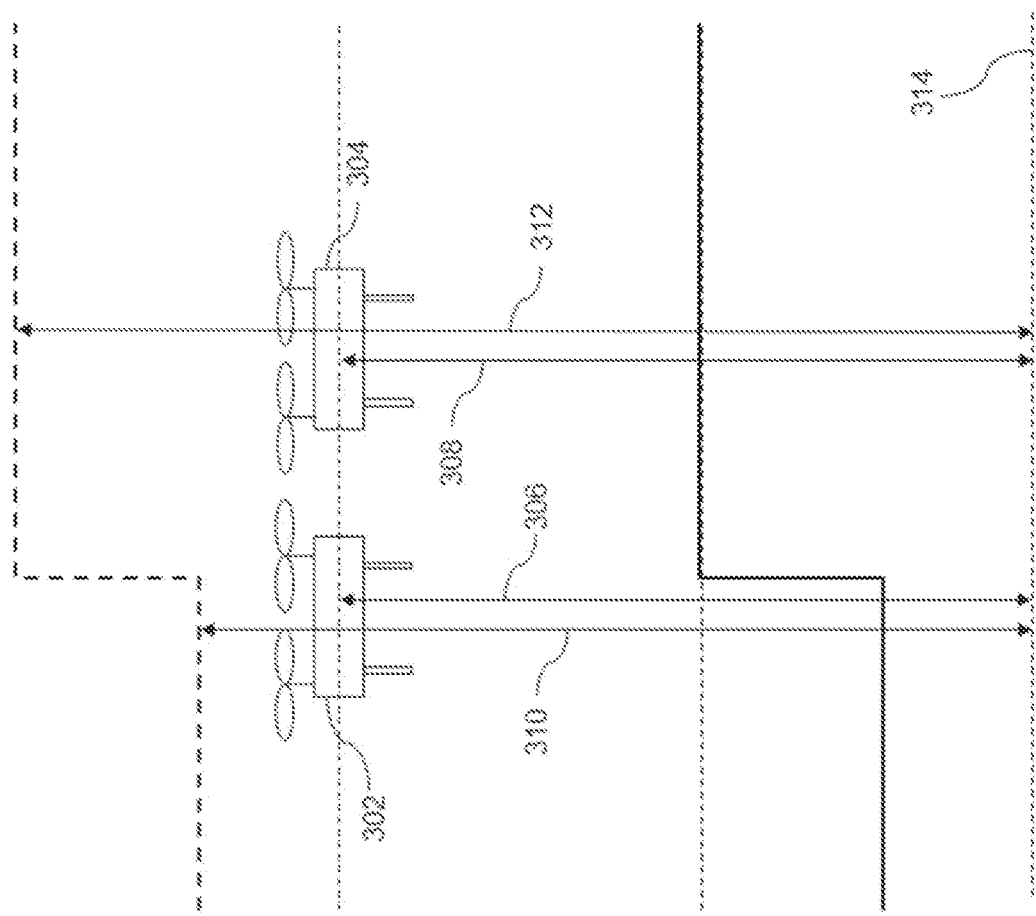
FIG. 3 provides an illustration of a UAV dynamically processing an altitude restriction which is compared to an altitude measurement of the UAV, in accordance with embodiments.

Altitude restrictions may be dynamically processed during operation of the UAV. FIG. 3 illustrates a single UAV at time points T1 302 and T2 304 dynamically processing the maximum altitude restriction which is compared to the UAV altitude measurement. Modifying the altitude restriction may involve increasing or decreasing the maximum or minimum altitude which the UAV is allowed to navigate based on elevation information. While similar to FIG. 2, instead of adjusting the altitude measurements of the UAV 306, 308, the altitude restriction is adjusted according to the local terrain elevation. Thus, while the UAV is subject to a constant altitude measurement at T1 and T2, after adjustment, the UAV is subject to a maximum altitude restriction 310 at T1 but a different maximum altitude restriction 312 at T2. In this embodiment, the UAV altitude restrictions are provided relative not to the ground level, but to the same reference level 314 that altitude measurements of the UAV is based on (e.g. MSL) such that proper comparison between the two values may be made.

Figure 17:
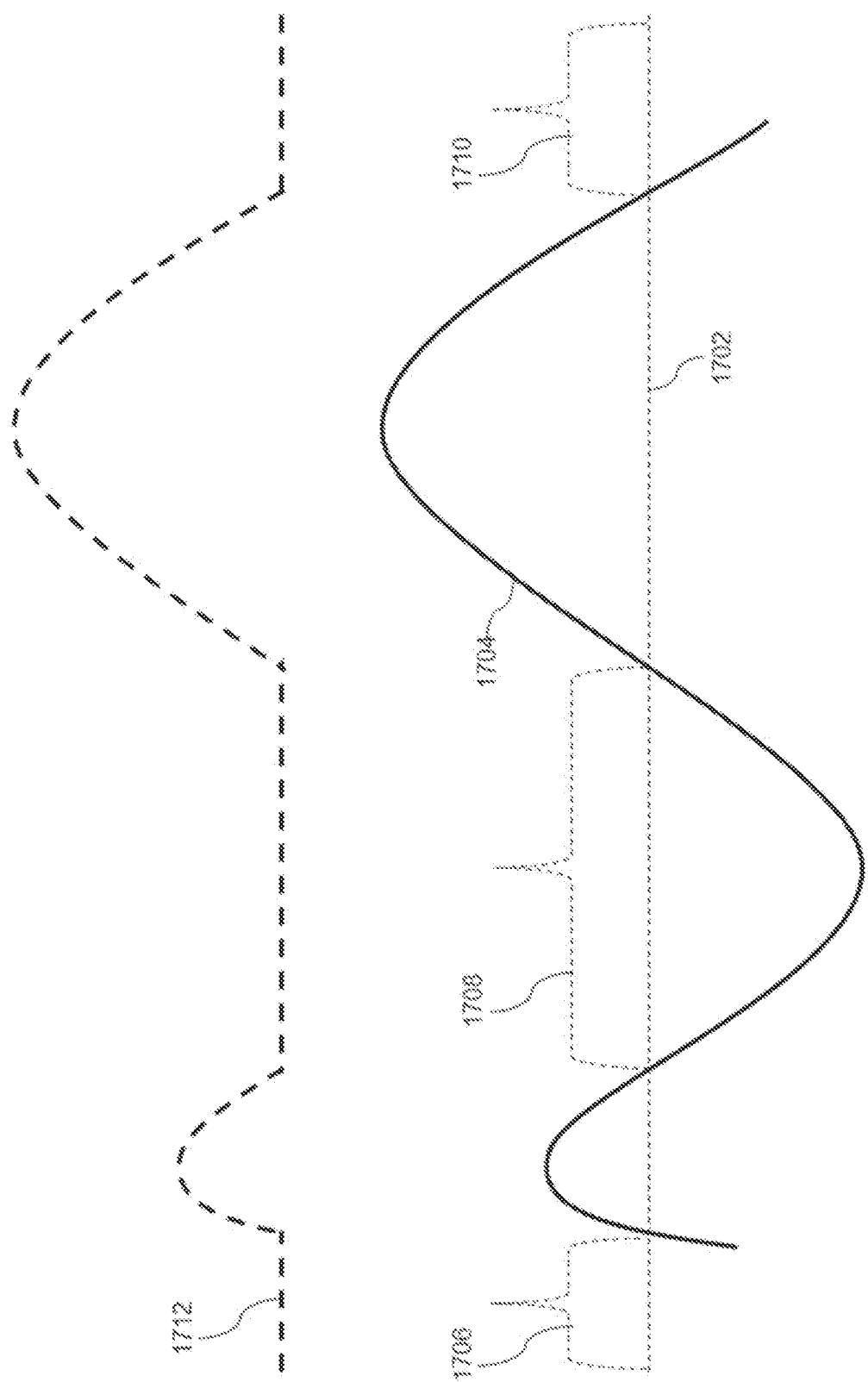
FIG. 17 illustrates a modified altitude restriction that takes into account only elevation of terrain above a MSL, in accordance with an embodiment of the disclosure.

Altitude restrictions may be dynamically processed during operation of the UAV such that only an elevation of terrain above a certain reference level (e.g., MSL) is taken into account for adjustment of altitude restrictions. For example, FIG. 17 illustrates a modified altitude restriction that takes into account only elevation of terrain above a MSL, in accordance with embodiments. FIG. 17 shows a MSL 1702 and terrain 1704 that varies in elevation across the horizontal axis. Areas 1706, 1708, 1710 of the terrain are below sea level and may not be taken into account in adjusting the altitude restriction of the UAV. The adjusted altitude restriction 1712 reflects a combination of adjusted altitude restrictions and unadjusted altitude restrictions across the horizontal axis. The UAV may operate under differing altitude restriction adjustments for different altitude restrictions. For example, for altitude ceilings, the UAV may only take into account elevation of terrain above a certain reference level (e.g., MSL) while for altitude floors, the UAV may take into account elevation of terrain regardless of whether the terrain is above or below the aforementioned reference level. It shall be understood that altitude measurements of the UAV may also be dynamically processed during operation of the UAV such that only an elevation of terrain above a certain reference level is taken into account for adjustment of UAV altitude measurements.

In some embodiments, a similar effect may be provided by defining an altitude restriction to be a particular altitude above a reference level that is the greater of the MSL or the ground level. For example, the altitude restriction may be defined as a particular altitude above the MSL when the MSL is higher than the ground level, and above the ground level when the ground level is higher than the MSL.

Alternatively or in conjunction, altitude sensors that inherently take into account the ground level may be used to determine the altitude of the UAV (e.g., absolute altitude of the UAV). The absolute altitude of the UAV may be compared to an altitude restriction without further processing. Such altitude sensors include, but are not limited to, sonic, radar, ultrasonic, Synthesized Aperture Radar (SAR), Time of Flight (TOF), and/or visual sensors which can estimate a weighted average of distance from the UAV to ground or obstacle beneath the UAV in a time window. The altitude sensors that inherently take into account the ground level may be useful independently, or in instances when the location of the UAV cannot be determined (e.g. GPS unavailable) and/or the terrain map information cannot be accessed.

In some embodiments, a UAV may have a plurality of sensors or types of sensors that may be used to determine an altitude of the UAV. Optionally, the UAV may have at least one sensor that detects an absolute altitude of the UAV, and at least one sensor that detects a true altitude of the UAV. Depending on various factors, particular sensors may be selected to be used in the determination of the UAV altitude. For example, both types of sensors may be operating to collect altitude data but only data from a selected subset of sensors may be considered in the determination of the UAV altitude. Alternatively, a subset of the sensors may be operating for a given scenario. In some embodiments, depending on the location of the UAV, a subset of the sensors may be used to provide data that is considered for determining an altitude of the UAV. In another example, depending on the type of altitude restrictions in place for the UAV, a subset of sensors may be used to provide data that is considered for determining an altitude of the UAV. For example, if the UAV is in a region where the altitude restrictions are based on true altitude, then data from the sensors that detect a true altitude of the UAV may be used to determine an altitude of the UAV. If the UAV is in a region where the altitude restrictions are based on absolute altitude, then data from the sensors that detect an absolute altitude of the UAV may be used to determine an altitude of the UAV.

In some embodiments, data from sensors may be used to determine ground elevation relative to MSL. For example, data from a type of sensor that measures an absolute altitude of the UAV may be compared with data from a type of sensor that measures a true altitude of the UAV. The comparison of the data may be used to calculate an estimated elevation of the ground level beneath the UAV. This may be useful in the event that other sources of ground level information (e.g., maps, stored elevations) are not accessible or operable. In one example, a first sensor may measure that a UAV is flying 200 m above ground level, and a second sensor may measure that a UAV is flying at 300 m above MSL. Based on the comparison of the data, the local ground level may be determined to be about 100 m. The local ground level may aid in adjustment of altitude restrictions, or determining a vertical relationship between the UAV altitude and the altitude restriction.

Figure 4:
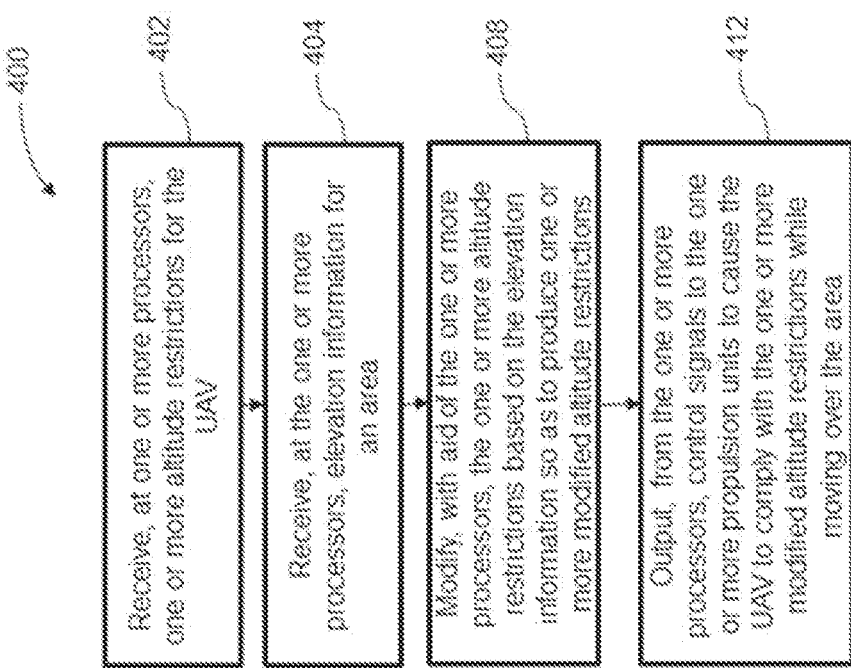
FIG. 4 illustrates a method for controlling movement of an unmanned aerial vehicle (UAV) having one or more propulsion units, in accordance with embodiments.

FIG. 4 illustrates a method 400 for controlling movement of an unmanned aerial vehicle (UAV) having one or more propulsion units, in accordance with embodiments. Method 400 may involve comparing an altitude measurement of the UAV against one or more altitude restrictions adjusted with elevation information.

In step 402, one or more altitude restrictions for the UAV may be received at the one or more processors of the UAV. The altitude restrictions may be received as previously described herein (e.g., from memory, user input, etc). The restrictions may be a maximum altitude, a minimum altitude, or a combination thereof (e.g., UAV flight allowed in a range). There may be a plurality of maximum altitudes (e.g., pre-programmed maximum altitude and a user input maximum altitude). There may be a plurality of minimum altitudes. A user input altitude restriction may or may not override the other altitude restrictions. The altitude restriction may or may not depend on a lateral (e.g., geography) location of the UAV. For example, the altitude ceiling near an airport may be 0 relative to the ground.

In step 404, elevation information for an area can be received at the one or more processors. The elevation information may be a map of the area including elevation information. Elevation information may be indicative of height of manmade structures in the area (e.g., buildings) and/or natural structures in the area (e.g., trees). Elevation information may be indicative of elevation of terrain in the area.

In addition to altitude restrictions, there may be other restrictions applicable towards manmade structures. For example, the UAV may be required to maintain a specified horizontal and/or vertical distance from manmade structures or be required to maintain a specified velocity and/or acceleration within a certain distance of the manmade structures. The aforementioned other restrictions may be applicable to natural terrain and structures as well. For example, the UAV may be required to maintain a specified horizontal and/or vertical distance from a mountain peak or be required to maintain a specified velocity and/or acceleration within a certain distance of the mountain peak.

The altitude measurement of the UAV may be received at the one or more processors. The altitude measurement may be a measurement produced by an altitude sensor mentioned herein (e.g., a GPS on board the UAV). The altitude measurement may be an altitude measurement made relative to a reference point mentioned herein (e.g. true altitude measurement measured relative to MSL). The altitude measurement may be made about or within every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second.

The UAV may be located as described herein (e.g., using a GPS). The UAV may be located on the map. The elevation of the terrain at the location of the UAV may be determined as described herein (e.g., read out from the elevation information using a processor). The UAV may be located about or within every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second.

In step 408, the altitude restriction of the UAV can be modified based on the elevation information as to produce a modified altitude restriction. For example, based on the elevation information, the elevation of the terrain at the location of the UAV (received in step 404) may be subtracted from the one or more altitude restrictions. The calculations may take place about or within every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second. The location of where the altitude information of the UAV was received and the elevation of the terrain at the location of the UAV determined may identical. The lateral location of where the altitude information of the UAV was received and where the elevation of the terrain at the location of the UAV was received may or may not match up. The lateral locations may be within 1000 m, 500 m, 200 m, 100 m, 50 m, 20 m, 10 m, 5 m, 2 m, 1 m, or 0.5 m. The one or more modified altitude restrictions of the UAV of step 408 may be compared to the altitude measurement of the UAV.

Method 400 may be repeated at a predetermined time interval during operation of the UAV. The time interval may be at or within about every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second.

In step 412, control signals from the one or more processors may be output to the one or more propulsion units to cause the UAV to comply with the altitude restrictions based on the comparison. If the UAV is in compliance with the one or more adjusted altitude restrictions, there may be no reason to output control signals and step 412 may be optional. If the UAV is in compliance with the one or more adjusted altitude restrictions but is in close proximity to the altitude restrictions (e.g., within 0.5 m, 1 m, 2 m, 3 m, 4 m, 5 m, 7 m, 10 m, 20 m, 50 m, 100 m, or 200 m of the altitude restriction), control signals may be output such that the UAV moves further away from the restricted altitude or such that the UAV is rendered incapable of moving closer to the restricted altitude. As an alternative or supplement to step 412, an alert or warning described herein may be issued instead. The control signal may affect operation of the UAV immediately after the comparison is made or if the UAV continues its flight in a restricted altitude for a period of time. The period of time may be about or below 10 minutes, 5 minutes, 2 minutes, 1 minute, 30 seconds, 10 seconds, 5 seconds, 2 seconds, or 1 second. While adjustments of altitude restrictions are described primarily herein, it shall be understood that altitude measurement of the UAV may be adjusted in the alternative to achieve similar results as illustrated by FIG. 10 (adjustment of altitude restriction) and FIG. 11 (adjustment of altitude measurement of the UAV).

Figure 10:
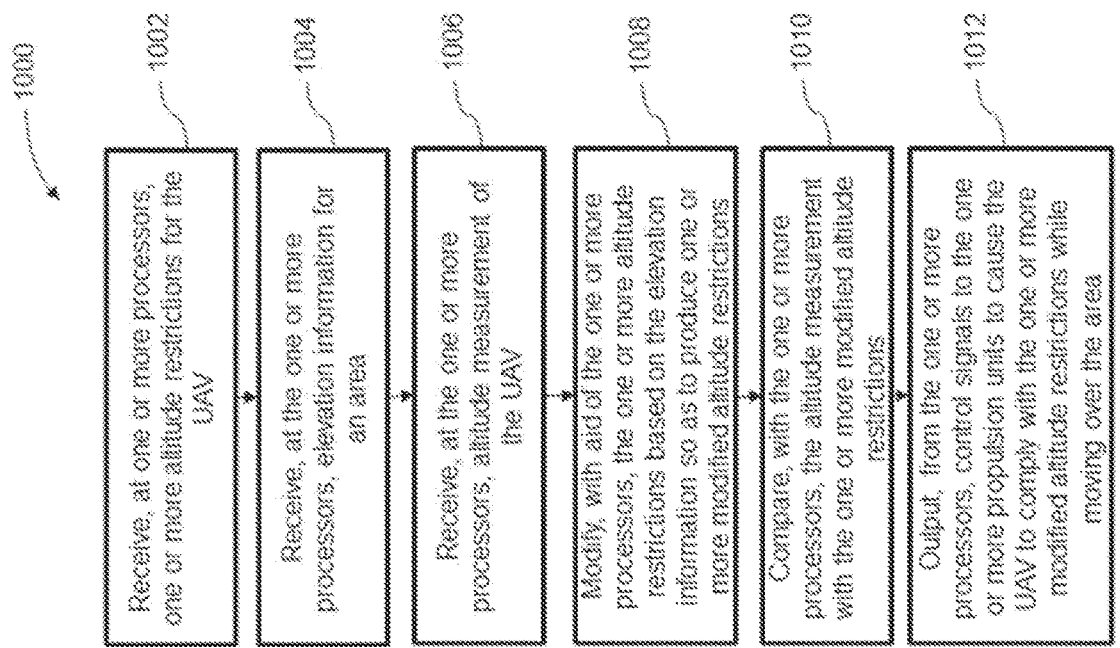
FIG. 10 illustrates a method for comparing one or more dynamically modified altitude restrictions with an altitude measurement of the UAV, in accordance with an embodiment of the disclosure.

FIG. 10 illustrates a method 1000 of comparing one or more dynamically modified altitude restrictions with an altitude measurement of a UAV. The method may include one or more of the steps described herein, or may include the steps provided in a different order. For example, the method may include receiving, at one or more processors, one or more altitude restrictions for the UAV 1002. The method may also include receiving, at the one or more processors, elevation information for an area 1004. The one or more processors may receive altitude measurement of the UAV 1006. This information may be gathered using any of the techniques described elsewhere herein.

The method may also include modifying, with aid of the one or more processors, the one or more altitude restrictions based on the elevation information to produce one or more modified altitude restrictions 1008.

The altitude measurement may be compared with the one or more modified altitude restrictions 1010. Such a comparison may occur using the one or more processors, individually or collectively. The one or more processors may output control signals to one or more propulsion units to cause the UAV to comply with the one or more modified altitude restrictions while moving over the area 1012.

Figure 11:
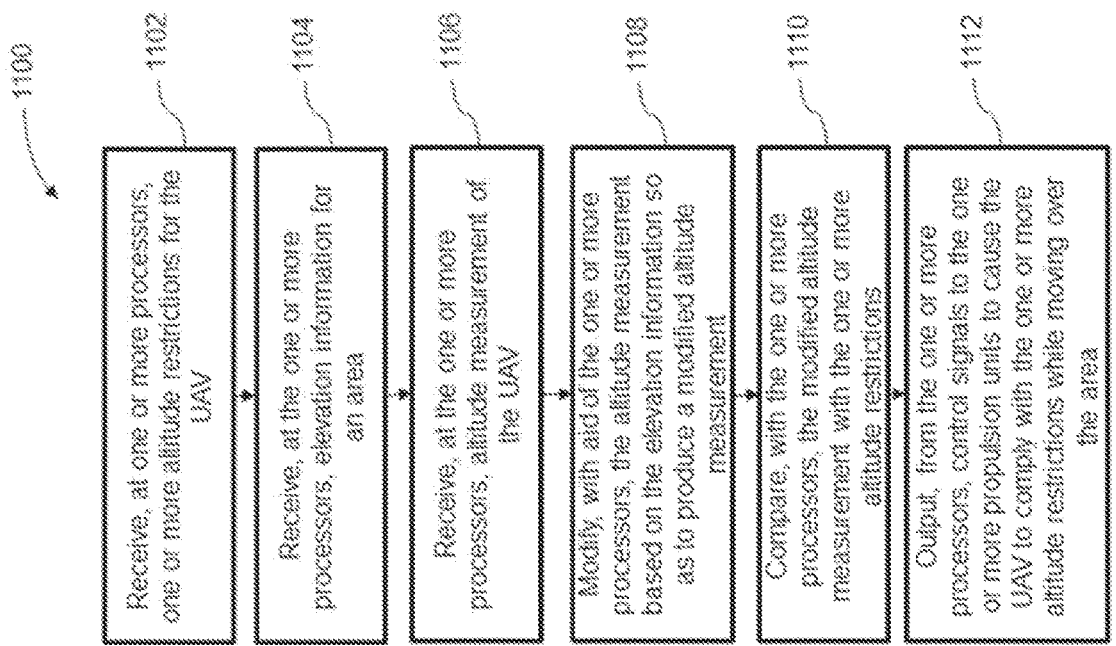
FIG. 11 illustrates a method for comparing a dynamically modified altitude measurement of the UAV with one or more altitude restrictions, in accordance with an embodiment of the disclosure.

FIG. 11 illustrates a method 1100 of comparing one or more dynamically modified altitude measurements with an altitude restriction of a UAV. The method may include one or more of the steps described herein, or may include the steps provided in a different order. For example, the method may include receiving, at one or more processors, one or more altitude restrictions for the UAV 1102. The method may also include receiving, at the one or more processors, elevation information for an area 1104. The one or more processors may receive altitude measurement of the UAV 1106. This information may be gathered using any of the techniques described elsewhere herein.

The method may also include modifying, with aid of the one or more processors, the altitude measurement based on the elevation information to produce a modified altitude measurement 1108.

The modified altitude measurement may be compared with the one or more altitude restrictions 1110. Such a comparison may occur using the one or more processors, individually or collectively. The one or more processors may output control signals to one or more propulsion units to cause the UAV to comply with the one or more altitude restrictions while moving over the area 1112.

Figure 5:
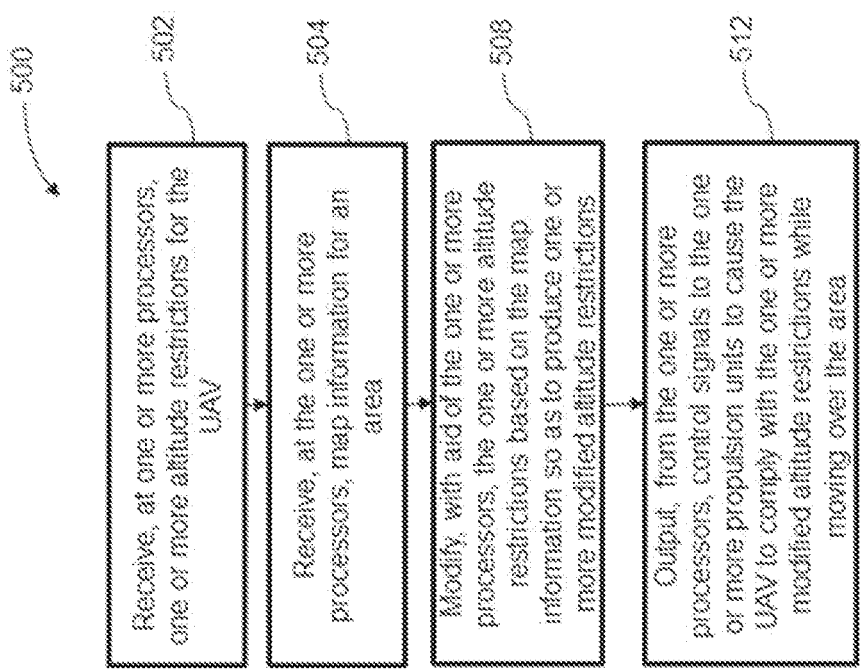
FIG. 5 illustrates a method for controlling movement of an unmanned aerial vehicle (UAV) having one or more propulsion units, in accordance with embodiments.

FIG. 5 illustrates a method 500 for controlling movement of an unmanned aerial vehicle (UAV) having one or more propulsion units, in accordance with embodiments. Method 500 may involve comparing an altitude measurement of the UAV against one or more altitude restrictions adjusted with map information.

In step 502, one or more altitude restrictions for the UAV may be received at the one or more processors of the UAV. The altitude restrictions may be received as previously described herein (e.g., from memory, user input, etc). The restrictions may be a maximum altitude, a minimum altitude, or a combination (e.g., a range). There may be a plurality of maximum altitudes (e.g., pre-programmed maximum altitude and a user input maximum altitude). There may be a plurality of minimum altitudes. A user input altitude restriction may or may not override the other altitude restrictions. The altitude restriction may or may not depend on a lateral (e.g., geography) location of the UAV. For example, the altitude ceiling near an airport may be 0 relative to the ground.

In step 504, map information for an area can be received at the one or more processors. Map information may or may not include elevation information of an area. Elevation information may be indicative of elevation of terrain in the area. Elevation information may be indicative of height of manmade and/or natural structures in the area. Map information may include other information that may affect altitude restrictions such as locations of flight-restricted regions (e.g., airports), locations of regions with tall natural and/or manmade structures, and so on. Receiving map information may comprise receiving a map of the area. The map may be a terrain map or a topographical map. The map information can be preloaded onto the UAV prior to operation. Alternatively or in addition, the map information can be uploaded to the UAV during operation.

Flight-restricted regions may include prohibited airspace, which may refer to an area (or volume) of airspace within which flight of aircraft is not allowed, usually due to security concerns. Prohibited areas may contain airspace of defined dimensions identified by an area on the surface of the earth within which the flight of aircraft is prohibited. Such areas can be established for security or other reasons associated with the national welfare. These areas may be published in the Federal Register and are depicted on aeronautical charts in the United States, or in other publications in various jurisdictions. The flight-restricted region may include one or more of special use airspace (e.g., where limitations may be imposed on aircraft not participating in designated operations), such as restricted airspace (i.e., where entry is typically forbidden at all times from all aircraft and is not subject to clearance from the airspace's controlling body), military operations areas, warning areas, alert areas, temporary flight restriction (TFR) areas, national security areas, and controlled firing areas.

Examples of flight-restricted regions may include, but are not limited to, airports, flight corridors, military or other government facilities, locations near sensitive personnel (e.g., when the President or other leader is visiting a location), nuclear sites, research facilities, private airspace, de-militarized zones, certain jurisdictions (e.g., townships, cities, counties, states/provinces, countries, bodies of water or other natural landmarks), or other types of no-fly zones. A flight-restricted region may be a permanent no-fly zone or may be a temporary area where flight is prohibited. In some instances, a list of flight-restricted regions may be updated.

Examples of regions with tall structures may include, but are not limited to, urban regions (e.g., cities with many skyscrapers and other tall buildings), forested regions (e.g., forests with extremely tall trees such as redwoods), archaeological sites (e.g., pyramids), and the like. The map information can include GPS data indicating the location of such regions.

In addition to altitude restrictions, there may be other restrictions applicable towards manmade structures. For example, the UAV may be required to maintain a specified horizontal and/or vertical distance from manmade structures or be required to maintain a specified velocity and/or acceleration within a certain distance of the manmade structures. The aforementioned other restrictions may be applicable to natural terrain and structures as well. For example, the UAV may be required to maintain a specified horizontal and/or vertical distance from a mountain range or be required to maintain a specified velocity and/or acceleration within a certain distance of the mountain range.

The altitude measurement of the UAV may be received at the one or more processors. The altitude information may be a measurement produced by an altitude sensor mentioned herein (e.g., a GPS on board the UAV). The altitude information may be an altitude measurement made relative to a reference point mentioned herein (e.g. true altitude measurement measured relative to MSL). The altitude measurement may be made about or within every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second.

The UAV may be located as described herein (e.g., using a GPS). The UAV may be located on the map. The elevation of the terrain at the location of the UAV may be determined as described herein (e.g., read out from the map information). The UAV may be located about or within every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second.

In step 508, the altitude restriction of the UAV can be modified based on the map information as to produce a modified altitude restriction. For example, based on the map information, the UAV may locate an airport nearby and decrease the maximum altitude restriction near an airport to better comply with the flight restriction in the event it encroaches upon a flight restricted region. Alternatively or in conjunction, if the map information contains elevation information, the elevation of the terrain at the location of the UAV determined may be subtracted from the one or more altitude restrictions. The calculations may take place about or within every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second. The location of where the altitude information of the UAV was received and the elevation of the terrain at the location of the UAV determined may be identical. The lateral location of where the altitude information of the UAV was received and where the elevation of the terrain at the location of the UAV was received may or may not match up. The lateral locations may be within 1000 m, 500 m, 200 m, 100 m, 50 m, 20 m, 10 m, 5 m, 2 m, 1 m, or 0.5 m. The one or more modified altitude restrictions of the UAV of step 508 may compared to the altitude measurement of the UAV.

Method 500 may be repeated at a predetermined time interval during operation of the UAV. The time interval may be at or within about every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second.

In step 512, control signals from the one or more processors are output to the one or more propulsion units to cause the UAV to comply with the altitude restrictions based on the comparison. If the UAV is in compliance with the one or more adjusted altitude restrictions, there may be no reason to output control signals and step 512 may be optional. If the UAV is in compliance with the one or more adjusted altitude restrictions but is in close proximity to the altitude restrictions (e.g., within 0.5 m, 1 m, 2 m, 3 m, 4 m, 5 m, 7 m, 10 m, 20 m, 50 m, 100 m, or 200 m of the altitude restriction), controls signals may be output such that the UAV moves further away from the restricted altitude or such that the UAV is rendered incapable of moving closer to the restricted altitude. As an alternative or supplement to step 512, an alert or warning described herein may be issued instead. The control signal may affect operation of the UAV immediately after the comparison is made or if the UAV continues its flight in a restricted altitude for a period of time. The period of time may be about or below 10 minutes, 5 minutes, 2 minutes, 1 minute, 30 seconds, 10 seconds, 5 seconds, 2 seconds, or 1 second. While adjustments of altitude restrictions are described primarily herein, it shall be understood that altitude measurement of the UAV may be adjusted in the alternative to achieve similar results as illustrated by FIG. 10 (adjustment of altitude restriction) and FIG. 11 (adjustment of altitude measurement of the UAV).

Figure 6:
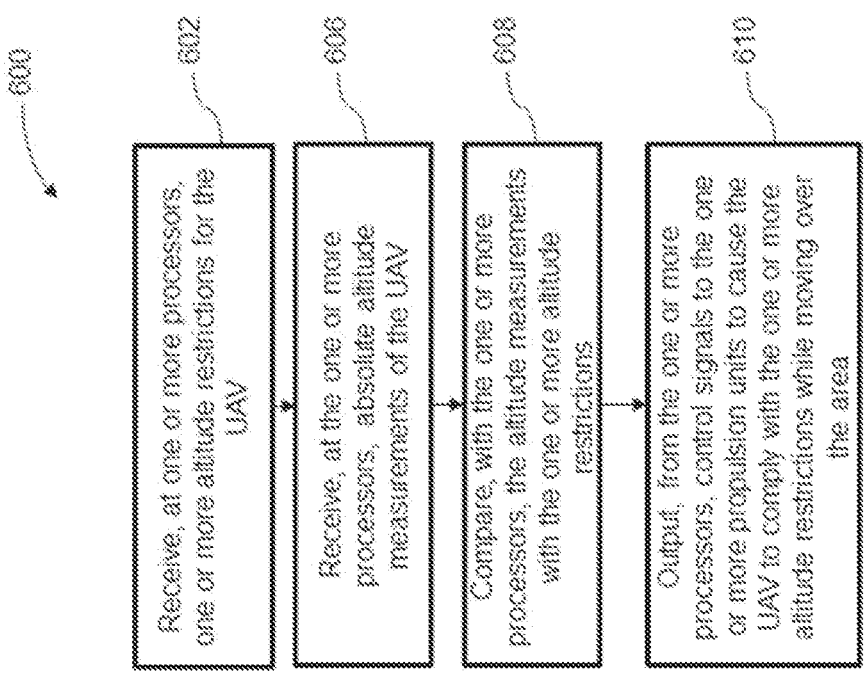
FIG. 6 illustrates a method for comparing absolute altitude measurements of the UAV with one or more altitude restrictions, in accordance with embodiments.

FIG. 6 illustrates a method 600 for controlling movement of an unmanned aerial vehicle (UAV) having one or more propulsion units, in accordance with embodiments. Method 600 may involve comparing one or more altitude restrictions against an altitude measurement of the UAV measured by a sensor that automatically accounts for local ground levels and/or heights of local structures on the ground (e.g., buildings, trees). Such sensors may include sonic, radar, ultrasonic, Synthesized Aperture Radar (SAR), Time of Flight (TOF), and/or visual sensors which can estimate a weighted average of distance from the UAV to ground or obstacle beneath the UAV in a time window. In some embodiments, the sensors are oriented vertically downward relative to the UAV in order to facilitate measurement of the distance between the UAV and the local ground level and/or local structures. This distance information can be used as a basis for dynamically modifying altitude restrictions.

In step 602, one or more altitude restrictions for the UAV can be received at one or more processors. In step 606, absolute altitude measurements of the UAV can be received at the one or more processors. In step 608, the altitude measurements of step 606 can be compared with the one or more altitude restrictions. In step 610, the one or more processors can output control signals to the one or more propulsion units to cause the UAV to comply with the one or more altitude restrictions. Method 600 may be a specialized version of method 400 or method 500 in which the altitude sensors measure the absolute altitude of the UAV instead of the true altitude. Method 600 may involve optionally receiving map information of the area. The map information may be utilized as previously described herein. It may be unnecessary to modify the altitude information based on the elevation of the terrain because the altitude sensors of method 600 inherently take into account the terrain elevation.

The altitude restrictions may be configured such that they are always active during UAV operation. The altitude restrictions may be configured such that they are never active during UAV operation. The altitude restrictions may be configured such that they are active sometimes and inactive at other times. For example, the altitude restrictions may be switched on or off automatically depending on predefined parameters (e.g. state of UAV, flight time, current altitude, location, etc) and/or based on user input.

Figure 7:
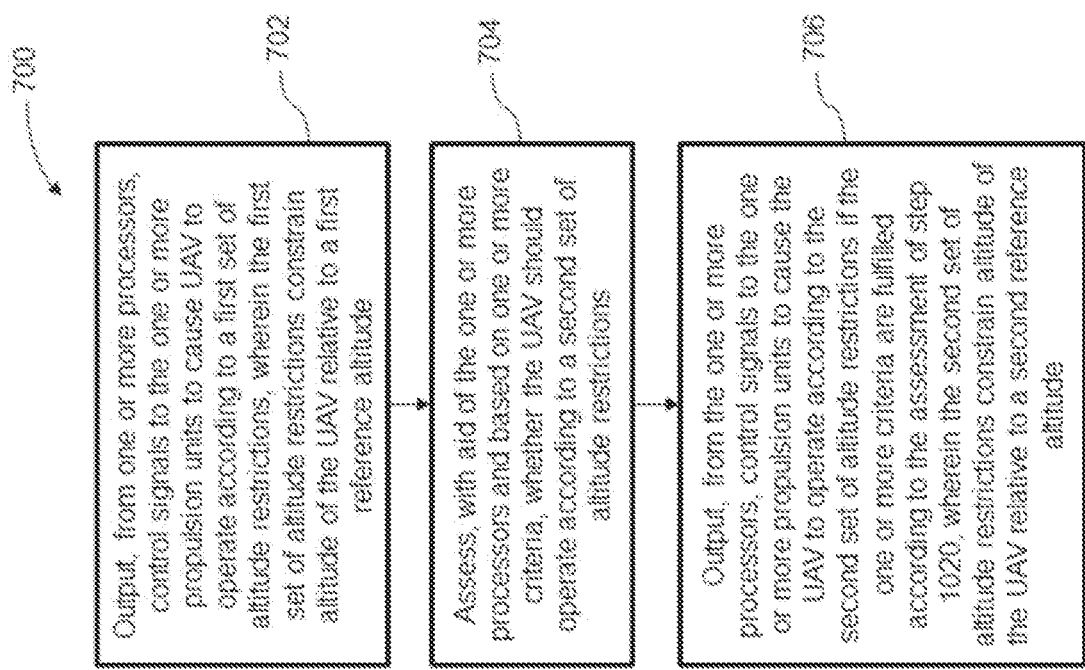
FIG. 7 illustrates a method for controlling movement of an unmanned aerial vehicle (UAV) having one or more propulsion units, in accordance with embodiments.

FIG. 7 illustrates a method 700 for controlling movement of an UAV having one or more propulsion units, in accordance with embodiments. Method 700 may involve a UAV having multiple altitude restrictions and selectively applying the restrictions depending on circumstances.

In step 702, control signals from one or more processors can be output to the one or more propulsion units to cause UAV to operate according to a first set of altitude restrictions. The first set of altitude restriction may be based on a first reference altitude. Examples of reference altitudes include ground level, sea level (MSL), average terrain level, geoid level, and the like. The first set of altitude restrictions and the second set of altitude restrictions may comprise a maximum altitude limit. The first set of altitude restrictions and the second set of altitude restrictions may comprise a minimum altitude limit. The maximum altitude limit may be about or below 10,000 m, 5,000 m, 2,000 m, 1,000 m, 500 m, 200 m, 140 m, 120 m, 100 m, 80 m, 60 m, 50 m, 40 m, 30 m, 20 m, 10 m, or 5 m. The minimum altitude limit may be about or above 1 m, 2 m, 3 m, 4 m, 5 m, 7 m, 10 m, 20 m, 40 m, 100 m, or 200 m.

In step 704, whether the UAV should operate according to a second set of altitude restrictions can be assessed with aid of the one or more processors and based on one or more criteria. The criteria may be based on predefined parameters (e.g., state of UAV, flight time, current altitude, location) and/or based on user input. The criteria may be set prior to flight of the UAV or may be input during flight. For example, the criteria may be whether a UAV has exceeded a predetermined flight time. The predetermined flight time may be about or less than 6000 seconds, 3000, 1200 seconds, 600 seconds, 300 seconds, 120 seconds, 60 seconds, 30 seconds, 10 seconds, or 5 seconds. The flight time may measure the total flight time recorded by the UAV. The flight time may measure flight time recorded for a particular flight session. The criteria may be whether battery of the UAV is running low. The criteria may be whether the UAV is moving above a certain velocity or acceleration. The criteria may be whether the UAV has exceeded a predefined altitude threshold. The predetermined altitude threshold may be about or above 10 m, 20 m, 40 m, 100 m, 200 m, or 400 m. The criteria may be whether the UAV is below a predetermined altitude floor. The criteria may be whether the current altitude of the UAV is greater than an altitude at an earlier point in time. The criteria may be whether the current altitude of the UAV is greater than an altitude of an initial location of the UAV. The criteria may be whether the UAV is within a restricted airspace or not. The criteria may be whether the UAV is near a restricted airspace. The criteria may be whether the second set of altitude restrictions are not currently prohibited by a controller for the UAV. The controller may be located onboard the UAV. The controller may be a remote control device in communication with the UAV.

In step 706, control signals from the one or more processors can be output to the one or more propulsion units to cause the UAV to operate according to the second set of altitude restrictions if the one or more criteria are fulfilled according to step 704. For example, when total flight time has exceeded a certain threshold, the UAV may operate under a second set of altitude restrictions with a higher altitude ceiling or a lower altitude floor than the first set of altitude restrictions, which may give a UAV operator greater freedom in controlling the UAV as total flight time is increased. For example, the UAV may operate under a second set of altitude restrictions with a lower altitude floor than the first set of altitude restrictions as battery runs low. For example, the UAV may operate under a second set of altitude restrictions with a higher altitude floor than the first set of altitude restrictions if the UAV is moving above a certain velocity, which may ensure the safety of people and reduce collision with ground objects. For example, when near a restricted airspace, the UAV may operate under a second set of altitude restrictions with a lower altitude floor compared to the first set of altitude restrictions to ensure that the UAV can land safely before entering restricted airspace. The second set of altitude restriction may be based on a second reference altitude. Examples of reference altitudes include ground level, sea level (mean sea level), average terrain level, geoid level, and the like. The second reference altitude and the first reference altitude may or may not be identical.

When the UAV is outside the flight restricted altitude, the UAV may prompt the user (e.g., via mobile application, flight status indicator, audio indicator, or other indicator) to land within the predetermined time period (e.g., 1 minute) or navigate to an altitude that complies with the restricted altitude. Within the time period, the operator of the UAV may provide instructions to navigate the UAV to a desired altitude and/or provide manual landing instructions. After the predetermined time period has been exceeded, the UAV may automatically navigate to comply with the altitude restrictions without any input from an operator of the UAV, or may incorporate input from the operator of the UAV. The UAV may automatically start decreasing in altitude after the predetermined time period. The UAV may automatically start increasing in altitude after the predetermined time period. The UAV may decrease or increase in altitude at a predetermined rate, or may incorporate location data in determining the rate at which to decrease in altitude, increase in altitude, or to land. In some instances, flight response measures closer to a flight-restricted region may provide more rapid response by the UAV to descend or land. This may reduce user autonomy in controlling the UAV flight but may provide greater compliance with regulations and provide greater safety measures. Flight response measures further from the flight-restricted region may permit a user to have more control over the UAV. This may provide increased user autonomy in controlling the UAV and allow the user to take action to prevent the UAV from entering restricted airspace. The distance can be used to measure risk or likelihood of the UAV falling within restricted airspace, and based on the measure of risk take an appropriate level of action.

In some embodiments, the methods described herein for dynamic adjustment of altitude restrictions account for laws and regulations regarding permissible altitudes for UAVs. For example, prior to modifying an altitude restriction in accordance with the methods presented herein, the UAV (e.g., one or more processors associated with the UAV) can compare the modified altitude restriction with a legally altitude restriction to determine whether the modified altitude restriction is legally compliant. If the modified restriction is compliant, the UAV can proceed to implement the modified restriction. If the modified restriction is not compliant, the UAV can maintain the original restriction, or adjust the modified restriction to be compliant. For example, if the modified restriction sets an altitude ceiling of 500 m but the legal restriction sets an altitude ceiling of 400 m, the UAV can implement an altitude ceiling of 400 m rather than 500 m in order to be compliant. In some embodiments, if it is determined that the altitude restrictions should be modified but the modification would not be legally compliant, an alert can be provided to the user as previously described herein (e.g., via an application on a mobile device or remote controller, via the UAV itself). The applicable laws and regulations can be provided to the UAV in various ways, e.g., preloaded onto the UAV prior to operation, uploaded to the UAV during operation, etc. In some embodiments, determination of the relevant laws and regulations can be performed based on the location information for the UAV (e.g., current GPS coordinates).

In some embodiments, the altitude restrictions described herein can be dynamically modified prior to the UAV approaching and/or flying over the elevated terrain and/or structures necessitating the modified altitude restrictions, e.g., when the UAV is a predetermined distance from the elevated terrain and/or structures. For example, if the UAV is flying towards an area with tall buildings, it can begin to increase the altitude ceiling when it is a predetermined distance from the area, instead of increasing the ceiling once it is flying over the area. This approach can allow the user to preemptively increase the UAV altitude in order to avoid collisions with elevated terrain and/or structures, as there may not be sufficient time to divert the UAV if the UAV is too close to the elevated terrain and/or structures, particularly if the UAV is moving at relatively high velocities.

The UAVs described herein can be operated completely autonomously (e.g., by a suitable computing system such as an on-board controller or off-board controller), semi-autonomously (e.g., with some aspects controlled manually and some aspects controlled automatically), or manually (e.g., by a human user utilizing a remote control device or a terminal). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera. Optionally, the UAV can be configured to operate in accordance with one or more predetermined operating rules. The operating rules may be used to control any suitable aspect of the UAV, such as the position (e.g., latitude, longitude, altitude), orientation (e.g., roll, pitch yaw), velocity (e.g., translational and/or angular), and/or acceleration (e.g., translational and/or angular) of the UAV. For instance, the operating rules can be designed such that the UAV is not permitted to fly beyond a threshold height, e.g., the UAV can be configured to fly at a height of no more than 400 m from the ground. In some embodiments, the operating rules can be adapted to provide automated mechanisms for improving UAV safety and preventing safety incidents. For example, the UAV can be configured to detect a restricted flight region (e.g., 1,200 ft above ground level) and not fly within a predetermined distance of the restricted flight region, thereby averting potential collisions with aircraft and other obstacles, ensuring compliance with the law, and providing an optimal user experience for its operators.

Figure 8:
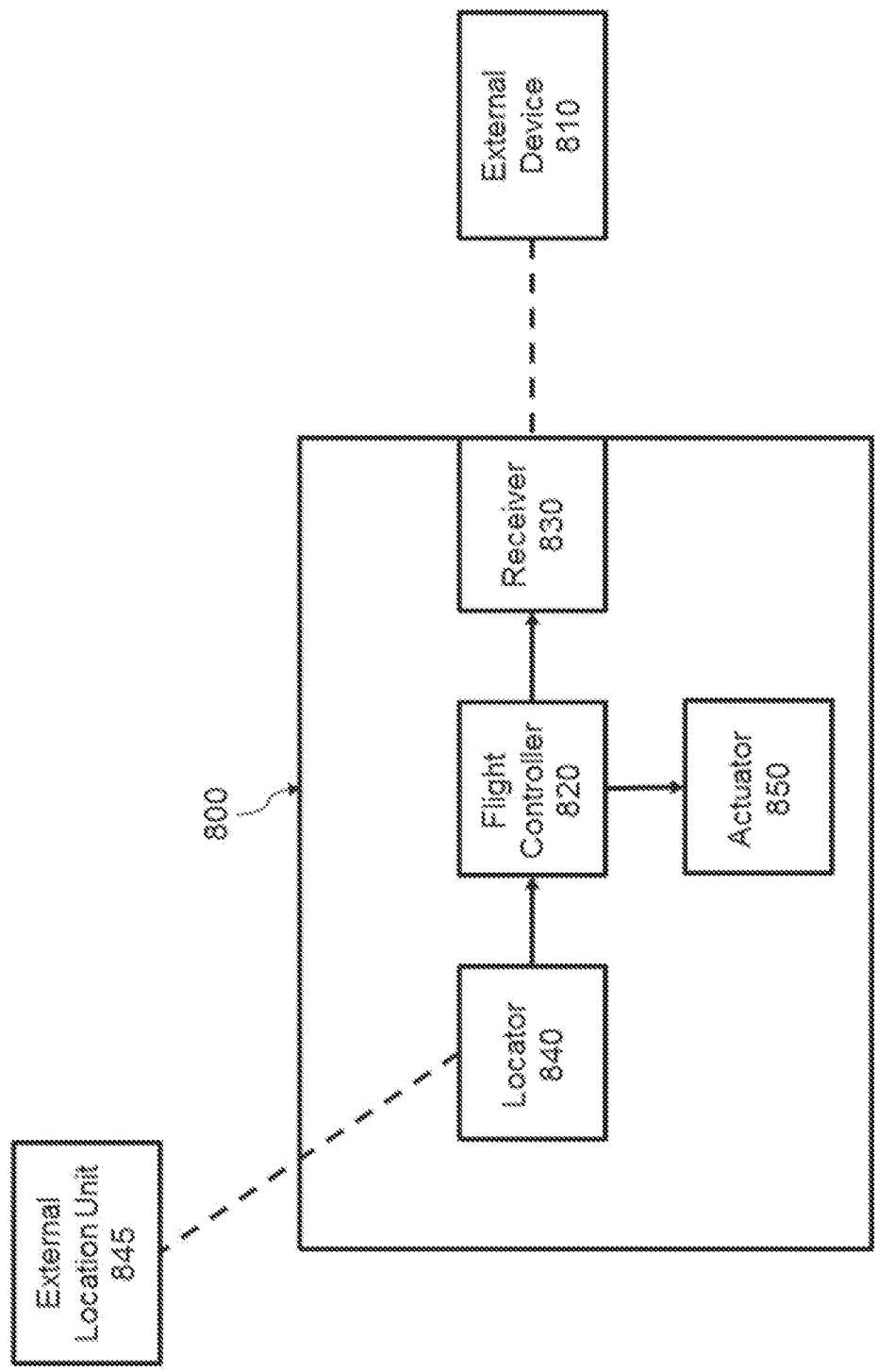
FIG. 8 provides a schematic illustration of an unmanned aerial vehicle in communication with an external device, in accordance with an embodiment of the disclosure.

FIG. 8 provides a schematic illustration of an unmanned aerial vehicle 800 in communication with an external device 810 in accordance with an embodiment of the disclosure.

The UAV 800 may include one or more propulsion units that may control position of the UAV. The propulsion units may control the location of the UAV (e.g., with respect to up to three directions, such as latitude, longitude, altitude) and/or orientation of the UAV (e.g., with respect to up to three axes of rotation, such as pitch, yaw, roll). The propulsion units may permit the UAV to maintain or change position. The propulsion units may include one or more rotor blades that may rotate to generate lift for the UAV. The propulsion units may be driven by one or more actuators 850, such as one or more motors. In some instances, a single motor may drive a single propulsion unit. In other examples, a single motor may drive multiple propulsion units, or a single propulsion unit may be driven by multiple motors.

Operation of one or more actuator 850 of the UAV 800 may be controlled by a flight controller 820. The flight controller may include one or more processors and/or memory units. The memory units may include non-transitory computer readable media, which may comprise code, logic, or instructions for performing one or more steps. The processors may be capable of performing one or more steps described herein. The processors may provide the steps in accordance with the non-transitory computer readable media. The processors may perform location-based calculations and/or utilize algorithms to generate a flight command for the UAV.

The flight controller 820 may receive information from a receiver 830 and/or locator 840. The receiver 830 may communicate with an external device 810. The external device may be a remote terminal. The external device may be a control apparatus that may provide one or more sets of instructions for controlling flight of the UAV. A user may interact with the external device to issue instructions to control flight of the UAV. The external device may have a user interface that may accept a user input that may result in controlling flight of the UAV. Examples of external devices are described in greater detail elsewhere herein.

The external device 810 may communicate with the receiver 830 via a wireless connection. The wireless communication may occur directly between the external device and the receiver and/or may occur over a network, or other forms of indirect communication. In some embodiments, the wireless communications may be proximity-based communications. For example, the external device may be within a predetermined distance from the UAV in order to control operation of the UAV. Alternatively, the external device need not be within a predetermined proximity of the UAV. Communications may occur directly, over a local area network (LAN), wide area network (WAN) such as the Internet, cloud environment, telecommunications network (e.g., 3G, 4G), WiFi, Bluetooth, radiofrequency (RF), infrared (IR), or any other communications technique. In alternate embodiments, the communications between the external device and the receiver may occur via a wired connection.

Communications between the external device and the UAV may be two-way communications and/or one-way communications. For example, the external device may provide instructions to the UAV that may control the flight of the UAV. The external device may operate other functions of the UAV, such as one or more settings of the UAV, one or more sensors, operation of one or more payloads, operation of a carrier of the payload, or any other operations of the UAV. The UAV may provide data to the external device. The data may include information about the location of the UAV, data sensed by one or more sensors of the UAV, images captured by a payload of the UAV, or other data from the UAV. The instructions from the external device and/or data from the UAV may be transmitted simultaneously or sequentially. They may be transferred over the same communication channel or different communication channels. In some instances, instructions from the external device may be conveyed to the flight controller. The flight controller may utilize the flight control instructions from the external device in generating a command signal to one or more actuators of the UAV.

The UAV may also include a locator 840. The locator may be used to determine a location of the UAV. The location may include a latitude, longitude, and/or altitude of the aerial vehicle. The location of the UAV may be determined relative to a fixed reference frame (e.g., geographic coordinates). The location of the UAV may be determined relative to a map received by the processors containing map information and/or elevation information. The location of the UAV may be determined relative to a flight-restricted region. The locator may use any technique or later developed in the art to determine the location of the UAV. For example, the locator may receive a signal from an external location unit 845. In one example, the locator may be a global positioning system (GPS) receiver and the external location unit may be a GPS satellite. In another example, the locator may be an inertial measurement unit (IMU), ultrasonic sensor, visual sensors (e.g., cameras), or communication unit communicating with an external location unit. The external location unit may include a satellite, tower, or other structure that may be capable of providing location information. One or more external location units may utilize one or more triangulation techniques in order to provide a location of the UAV. In some instances, the external location unit may be the external device 810 or other remote control device. The location of the external device may be used as the location of the UAV or to determine the location of the UAV. The location of the external device may be determined using a location unit within the external device and/or one or more base stations capable of determining the location of the external device. The location unit of the external device may use any of the techniques described herein including, but not limited to, GPS, laser, ultrasonic, visual, inertial, infrared, or other location sensing techniques. The location of an external device may be determined using any technique, such as GPS, laser ultrasonic, visual, inertial, infrared, triangulation, base stations, towers, relays, or any other technique.

In alternate embodiments, an external device or external location unit may not be needed to determine the location of the UAV. For instance, the IMU may be used to determine the location of the UAV. An IMU can include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU can be rigidly coupled to the aerial vehicle such that the motion of the aerial vehicle corresponds to motion of the IMU. Alternatively the IMU can be permitted to move relative to the aerial vehicle with respect to up to six degrees of freedom. The IMU can be directly mounted onto the aerial vehicle, or coupled to a support structure mounted onto the aerial vehicle. The IMU may be provided exterior to or within a housing of the movable object. The IMU may be permanently or removably attached to the movable object. In some embodiments, the IMU can be an element of a payload of the aerial vehicle. The IMU can provide a signal indicative of the motion of the aerial vehicle, such as a position, orientation, velocity, and/or acceleration of the aerial vehicle (e.g., with respect to one, two, or three axes of translation, and/or one, two, or three axes of rotation). For example, the IMU can sense a signal representative of the acceleration of the aerial vehicle, and the signal can be integrated once to provide velocity information, and twice to provide location and/or orientation information. The IMU may be able to determine the acceleration, velocity, and/or location/orientation of the aerial vehicle without interacting with any external environmental factors or receiving any signals from outside the aerial vehicle. The IMU may alternatively be used in conjunction with other location determining devices, such as GPS, visual sensors, ultrasonic sensors, or communication units.

The location determined by the locator 840 may be used by the flight controller 820 in the generation of one or more command signal to be provided to the actuator. For instance, the location of the UAV, which may be determined based on the locator information, may be used to determine the priority of the altitude restrictions in the event that there are competing altitude restrictions. The flight controller may further determine which flight response measure, if any, needs to be taken by the UAV. The flight controller may determine the command signal to the actuator(s), which may control the flight of the UAV.

Figure 9:
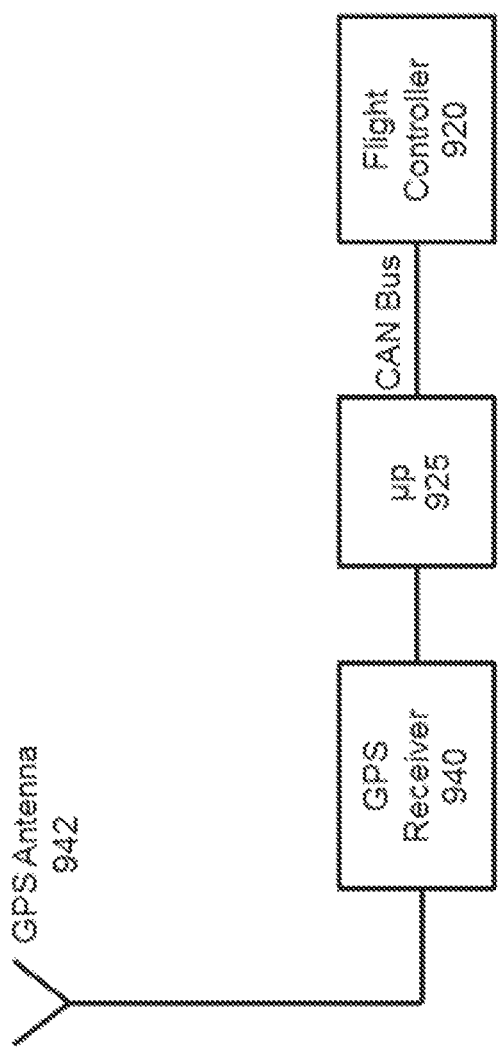
FIG. 9 provides an example of an unmanned aerial vehicle using a global positioning system (GPS) to determine the location of the unmanned aerial vehicle, in accordance with an embodiment of the disclosure.

FIG. 9 provides an example of an unmanned aerial vehicle using a global positioning system (GPS) to determine the location of the unmanned aerial vehicle, in accordance with an embodiment of the disclosure. The UAV may have a GPS module. The GPS module may include a GPS receiver 940 and/or a GPS antenna 942. The GPS antenna may pick up one or more signals from a GPS satellite or other structure and convey the captured information to the GPS receiver. The GPS module may also include a microprocessor 925. The microprocessor may receive information from the GPS receiver. The microprocessor may convey the data from the GPS receiver in a raw form or may process or analyze it. The microprocessor may perform calculations using the GPS receiver data and/or may provide location information based on the calculations.

The GPS module may be operably connected to a flight controller 920. The flight controller of a UAV may generate command signals to be provided to one or more actuators of the UAV and thereby control flight of the UAV. Any connection may be provided between the GPS module and the flight controller. For example, a communication bus, such as a controller area network (CAN) bus may be used to connect the GPS module and the flight controller. The GPS receiver may receive data via the GPS antenna, and may communicate data to the microprocessor, which may communicate data to a flight controller via the communication bus.

In some instances, once the UAV is turned on, the UAV may search for the GPS signal. If the GPS signal is found, the UAV may be able to determine its location and altitude. Some embodiments may rely on the aircraft GPS module to determine the location, including the altitude of the UAV. If the GPS module takes too long to successfully determine position, this will affect the capabilities of the flight. UAV flight functionality may be limited if the GPS module is inoperational or a GPS signal can not be detected. In some instances, other systems and methods may be used to determine a location, such as the altitude, of the UAV as described herein.

Figure 12:
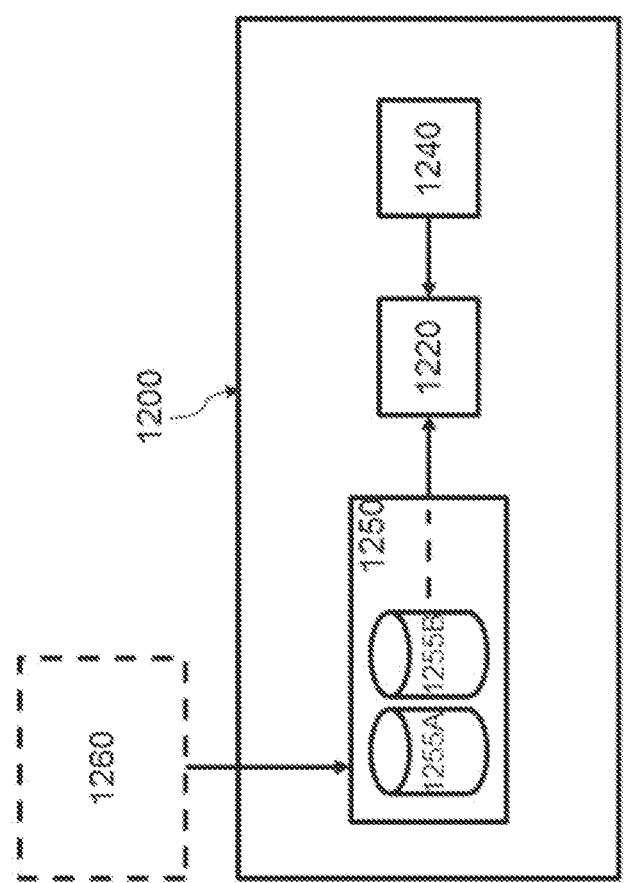
FIG. 12 provides an example of unmanned aerial vehicle with an on-board memory unit, in accordance with an aspect of the disclosure.

FIG. 12 provides an example of unmanned aerial vehicle 1200 with an on-board memory unit 1250, in accordance with an aspect of the disclosure. The UAV may have a flight controller 1220 which may generate one or more command signals to effect flight of the UAV. A location unit 1240 may be provided. The location unit may provide data indicative of an altitude and location of the UAV. The location unit may be a GPS receiver, communication module receiving location data from an external device, ultrasonic sensor, visual sensor, IR sensor, inertial sensor, or any other type of device that may be useful for determining the location of the UAV. The flight controller may use the location of the UAV to generate the flight command signal.

The memory unit 1250 may include data about elevation information or map information of regions the UAV may operate in. For example, one or more on-board database or memory 1255A may be provided, storing maps (e.g., topographic map) that include altitude information of the terrain and/or lists of flight-restricted regions and/or their location. In one example, maps of various regions may be stored in the on-board memory of the UAV. In one example, the memory storage device may store elevation information of the area covered by the map. All maps (e.g., topographic maps) in the world, continent, country, or region of the world may be stored in the memory unit. Alternatively or in conjunction, information regarding of flight-restricted regions or any other information that may affect altitude restrictions of the UAV may be stored. The coordinates may include only latitude and longitude coordinates, may further include altitude coordinates, or may include boundaries of flight-restricted regions. Thus information about terrain elevation, including locations and/or associated rules, may be pre-programmed onto the UAV.

The UAV may be able to access the on-board memory to determine the elevation and/or map information of a region it is operating in. This may be useful in situations where a communication of a UAV may be inoperable or may have trouble accessing an external source. For instance, some communication systems may be unreliable. In some instances, accessing on-board stored information may be more reliable and/or may require less power consumption. Accessing on-board stored information may also be faster than downloading the information in real-time.

In some instances, other data may be stored on-board the UAV. For example, databases and/or memory 1255B may be provided about rules relating to the particular flight-restricted altitudes or different jurisdictions. For example, the memory may store information on-board about flight rules for different jurisdictions. For example, Country A may not permit a UAV to fly more than 700 ft above ground level while Country B may not permit a UAV to fly more than 1200 ft above ground level. In some instances, the rules may be specific to jurisdictions. In some instances the rules may be specific to flight-restricted regions, regardless of jurisdiction. For example, within Country A, Airport A may not permit UAV flight anywhere within 5 miles of the airport at all times, while Airport B may permit UAV flight near the airport from 1:00-5:00 A.M. The rules may be stored on-board the UAV and may optionally be associated with the relevant jurisdictions and/or flight-restricted regions.

The rules stored in the databases may pertain to altitude restrictions for different jurisdictions or different regions. The rules may be provided by a manufacturer, a user, or a third party. The rules may be stored in the database and/or may be updated.

The flight controller 1220 may access the on-board memory to calculate an altitude of the UAV relative to an altitude restriction. In some embodiments, sensor data may be used to determine the altitude of the UAV in the comparison of the UAV altitude with the altitude restriction. Optionally, on-board memory, which may include elevation data regarding the ground level may be used to aid in the comparison. In some instances, the flight controller may also access the on-board memory to calculate a distance between the UAV and a flight-restricted region. The flight controller may use information from the location unit 1240 as the location of the UAV, and may use information from the on-board memory 1250 for the flight-restricted region location. A calculation of the distance between the UAV and flight-restricted region may be made by the flight controller, with aid of a processor.

The flight controller 1220 may access on-board memory to determine a flight response measure to take. For example, the UAV may access the on-board memory about different rules. The location of the UAV may be used to determine the flight response measure to be taken by the UAV in accordance with the relevant rules. For example, if the location of the UAV is determined to be within Country A, the flight controller may review the rules for Country A in determining the flight response measure to take. For example, this may include instructing the UAV to descend below an altitude ceiling when the UAV approaches or exceeds the altitude ceiling. This may affect the command signal generated and sent to one or more actuators of the UAV.

The on-board memory 1250 of the UAV may be updated. For example, a mobile device in communication with the UAV may be used for updates. When the mobile device and UAV are connected the on-board memory may be updated. The mobile device and the UAV may be updated via a wireless connection, such as a direct or indirect wireless connection. In one example, the connection may be provided via WiFi or Bluetooth. The mobile device may be used to control flight of the UAV and/or receive data from the UAV. Information such as elevation information or map information of a region may be updated. Such updates may occur while the mobile device interacting with the UAV. Such updates may occur when the mobile device first connects with the UAV, at periodic time intervals, when events are detected, or continuously in real-time.

In another example, a wired connection may be provided between the UAV and an external device for providing updates to on-board memory. For example, a USB port or similar port on the UAV may be used to connect to a personal computer (PC), and may use PC software to update. In another example, the external device may be a mobile device, or other type of external device. The updates may occur when the UAV first connects to the external device, at periodic time intervals while the wired connection remains, when events are detected, or continuously in real-time while the wired connection remains.

An additional example may permit the UAV to have a communication device for accessing the Internet or other network. Every time the UAV starts, it can automatically check whether the on-board memory needs to be updated. For example, every time the UAV starts, it can automatically check whether elevation or map information needs to be updated. In some embodiments, the UAV only checks whether there are updates to be made upon being turned on. In other embodiments, the UAV may make checks periodically, upon detected events or commands, or continuously.

In some instances, different jurisdictions may have different altitude restrictions. For example, different countries may have different rules and/or some rules may be more complicated depending on jurisdiction, and may need to be accomplished step by step. Examples of jurisdictions may include, but are not limited to continents, unions, countries, states/provinces, counties, cities, towns, private property or land, or other types of jurisdictions.

The location of the UAV may be used to determine the jurisdiction within which the UAV is currently located and whole rules may apply. For example, GPS coordinates can be used to determine the jurisdiction at which the UAV is located, and which laws apply. For example, jurisdiction A may prohibit flight of a UAV 700 ft above ground, while jurisdiction B may prohibit flight 1200 ft above ground. Then after the aircraft obtains GPS coordinates, it can determine whether it is currently located within jurisdiction A or jurisdiction B. Based on this determination, it may assess whether the flight restrictions are in play 700 ft or 1200 ft above ground, and may take a flight response measure accordingly.

For example, a boundary between jurisdictions may be provided. The UAV may be determined to fall within jurisdiction A which is to the right of the boundary, based on the UAV location. Jurisdiction B may be to the left of the boundary and may have different rules from jurisdiction A. In one example, the location of the UAV may be determined using any of the location techniques described elsewhere herein. Coordinates of the UAV may be calculated. In some instances, an on-board memory of the UAV may include boundaries for different jurisdiction. For example, the UAV may be able to access on-board memory to determine which jurisdiction the UAV falls within, based on its location. In other examples, information about the different jurisdictions may be stored off-board. For example, the UAV may communicate externally to determine which jurisdiction into which the UAV falls.

Thus, the UAV may be able to access information about the jurisdiction into which the UAV falls and/or applicable flight rules for the UAV. The altitude restrictions that are applicable may be used in conjunction with location information to determine whether a flight response measure is needed and/or which flight response measure should be taken.

The systems, devices, and methods described herein can be applied to a wide variety of movable objects. As previously mentioned, any description herein of a UAV may apply to and be used for any movable object. Any description herein of a UAV may apply to any aerial vehicle. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 13:
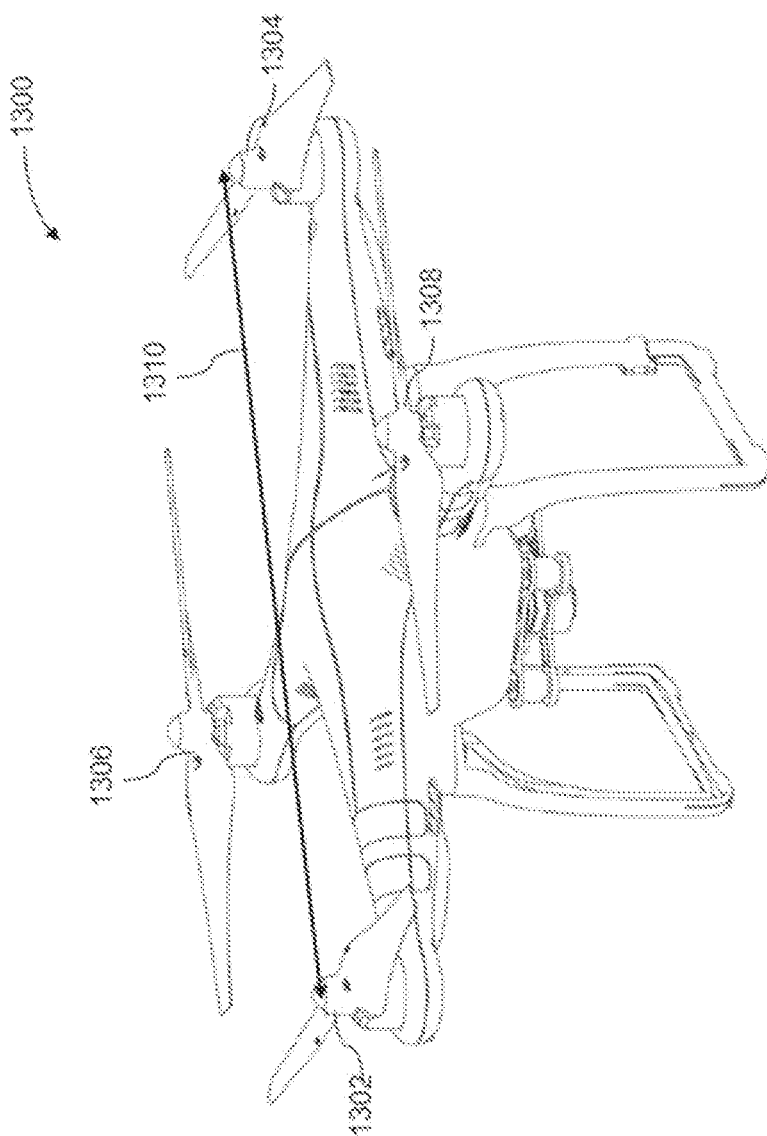
FIG. 13 illustrates an unmanned aerial vehicle, in accordance with an embodiment of the disclosure.

FIG. 13 illustrates an unmanned aerial vehicle (UAV) 1300, in accordance with embodiments of the present disclosure. The UAV may be an example of a movable object as described herein. The UAV 1300 can include a propulsion system having four rotors 1302, 1304, 1306, and 1308. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1310. For example, the length 1310 can be less than or equal to 2 m, or less than equal to 11 m. In some embodiments, the length 1310 can be within a range from 40 cm to 7 m, from 70 cm to 2 m, or from 11 cm to 11 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 14:
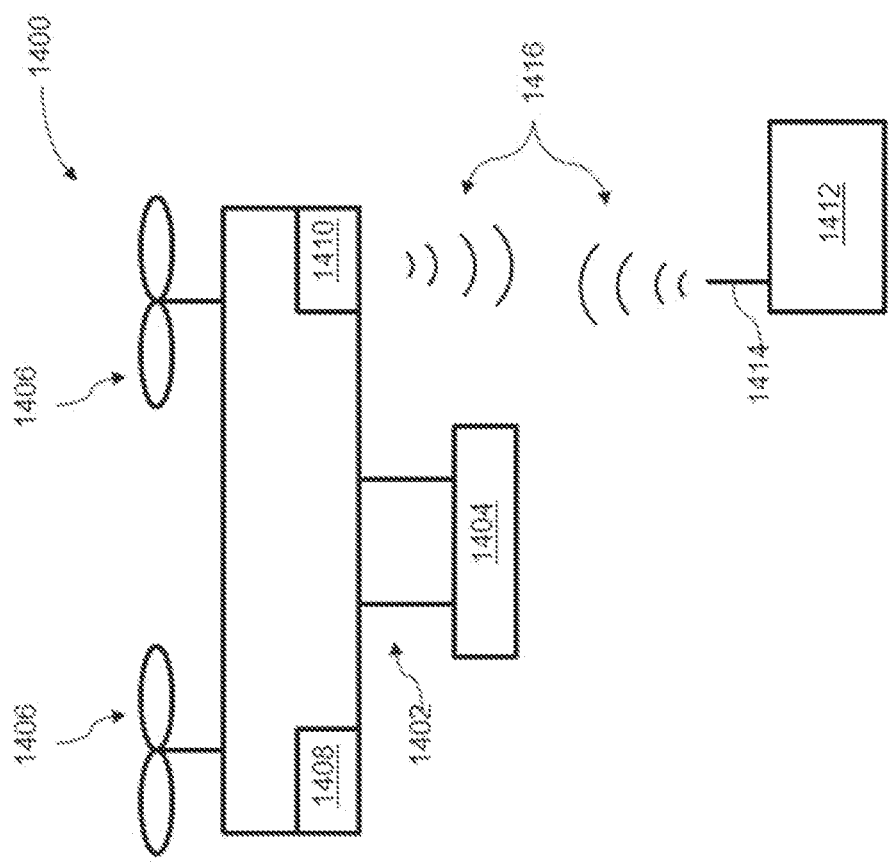
FIG. 14 illustrates a movable object including a carrier and a payload, in accordance with an embodiment of the disclosure.

FIG. 14 illustrates a movable object 1400 including a carrier 1402 and a payload 1404, in accordance with embodiments. Although the movable object 1400 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1404 may be provided on the movable object 1400 without requiring the carrier 1402. The movable object 1400 may include propulsion mechanisms 1406, a sensing system 1408, and a communication system 1410.

The propulsion mechanisms 1406 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1406 can be mounted on the movable object 1400 using any suitable means, such as a support element (e.g., a drive shaft) as described elsewhere herein. The propulsion mechanisms 1406 can be mounted on any suitable portion of the movable object 1400, such on the top, bottom, front, back, sides, or suitable combinations thereof.

In some embodiments, the propulsion mechanisms 1406 can enable the movable object 1400 to take off vertically from a surface or land vertically on a surface without requiring any horizontal movement of the movable object 1400 (e.g., without traveling down a runway). Optionally, the propulsion mechanisms 1406 can be operable to permit the movable object 1400 to hover in the air at a specified position and/or orientation. One or more of the propulsion mechanisms 1400 may be controlled independently of the other propulsion mechanisms. Alternatively, the propulsion mechanisms 1400 can be configured to be controlled simultaneously. For example, the movable object 1400 can have multiple horizontally oriented rotors that can provide lift and/or thrust to the movable object. The multiple horizontally oriented rotors can be actuated to provide vertical takeoff, vertical landing, and hovering capabilities to the movable object 1400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1400 (e.g., with respect to up to three degrees of translation and up to three degrees of rotation).

The sensing system 1408 can include one or more sensors that may sense the spatial disposition, velocity, and/or acceleration of the movable object 1400 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1408 can be used to control the spatial disposition, velocity, and/or orientation of the movable object 1400 (e.g., using a suitable processing unit and/or control module, as described below). Alternatively, the sensing system 1408 can be used to provide data regarding the environment surrounding the movable object, such as weather conditions, proximity to potential obstacles, location of geographical features, location of manmade structures, and the like.

The communication system 1410 enables communication with terminal 1412 having a communication system 1414 via wireless signals 1416. The communication systems 1410, 1414 may include any number of transmitters, receivers, and/or transceivers suitable for wireless communication. The communication may be one-way communication, such that data can be transmitted in only one direction. For example, one-way communication may involve only the movable object 1400 transmitting data to the terminal 1412, or vice-versa. The data may be transmitted from one or more transmitters of the communication system 1410 to one or more receivers of the communication system 1412, or vice-versa. Alternatively, the communication may be two-way communication, such that data can be transmitted in both directions between the movable object 1400 and the terminal 1412. The two-way communication can involve transmitting data from one or more transmitters of the communication system 1410 to one or more receivers of the communication system 1414, and vice-versa.

In some embodiments, the terminal 1412 can provide control data to one or more of the movable object 1400, carrier 1402, and payload 1404 and receive information from one or more of the movable object 1400, carrier 1402, and payload 1404 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1406), or a movement of the payload with respect to the movable object (e.g., via control of the carrier 1402). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1408 or of the payload 1404). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1412 can be configured to control a state of one or more of the movable object 1400, carrier 1402, or payload 1404. Alternatively or in combination, the carrier 1402 and payload 1404 can also each include a communication module configured to communicate with terminal 1412, such that the terminal can communicate with and control each of the movable object 1400, carrier 1402, and payload 1404 independently.

In some embodiments, the movable object 1400 can be configured to communicate with another remote device in addition to the terminal 1412, or instead of the terminal 1412. The terminal 1412 may also be configured to communicate with another remote device as well as the movable object 1400. For example, the movable object 1400 and/or terminal 1412 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1400, receive data from the movable object 1400, transmit data to the terminal 1412, and/or receive data from the terminal 1412. Optionally, the remote device can be connected to the Internet or other telecommunications network, such that data received from the movable object 1400 and/or terminal 1412 can be uploaded to a website or server.

Figure 15:
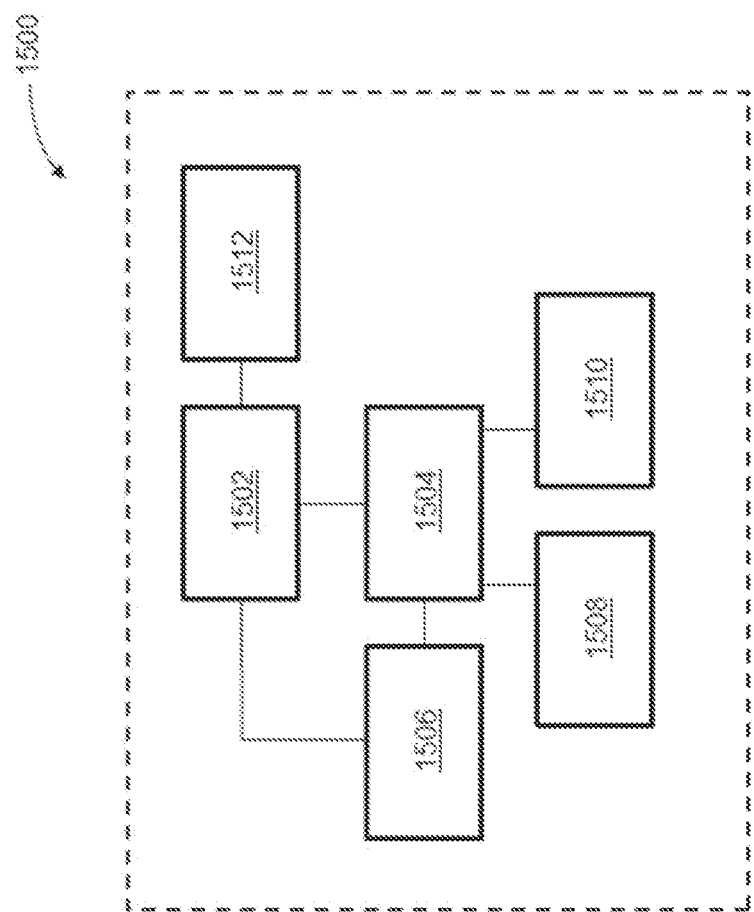
FIG. 15 is a schematic illustration by way of block diagram of a system for controlling a movable object, in accordance with an embodiment of the disclosure.

FIG. 15 is a schematic illustration by way of block diagram of a system 1500 for controlling a movable object, in accordance with embodiments. The system 1500 can be used in combination with any suitable embodiment of the systems, devices, and methods disclosed herein. The system 1500 can include a sensing module 1502, processing unit 1504, non-transitory computer readable medium 1506, control module 1508, and communication module 1510.

The sensing module 1502 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1502 can be operatively coupled to a processing unit 1504 having a plurality of processors. In some embodiments, the sensing module can be operatively coupled to a transmission module 1512 (e.g., a Wi-Fi image transmission module) configured to directly transmit sensing data to a suitable external device or system. For example, the transmission module 1512 can be used to transmit images captured by a camera of the sensing module 1502 to a remote terminal.

The processing unit 1504 can have one or more processors, such as a programmable processor (e.g., a central processing unit (CPU)). The processing unit 1504 can be operatively coupled to a non-transitory computer readable medium 1506. The non-transitory computer readable medium 1506 can store logic, code, and/or program instructions executable by the processing unit 1504 for performing one or more steps. The non-transitory computer readable medium can include one or more memory units (e.g., removable media or external storage such as an SD card or random access memory (RAM)). In some embodiments, data from the sensing module 1502 can be directly conveyed to and stored within the memory units of the non-transitory computer readable medium 1506. The memory units of the non-transitory computer readable medium 1506 can store logic, code and/or program instructions executable by the processing unit 1504 to perform any suitable embodiment of the methods described herein. For example, the processing unit 1504 can be configured to execute instructions causing one or more processors of the processing unit 1504 to analyze sensing data produced by the sensing module. The memory units can store sensing data from the sensing module to be processed by the processing unit 1504. In some embodiments, the memory units of the non-transitory computer readable medium 1506 can be used to store the processing results produced by the processing unit 1504.

In some embodiments, the processing unit 1504 can be operatively coupled to a control module 1508 configured to control a state of the movable object. For example, the control module 1508 can be configured to control the propulsion mechanisms of the movable object to adjust the spatial disposition, velocity, and/or acceleration of the movable object with respect to six degrees of freedom. Alternatively or in combination, the control module 1508 can control one or more of a state of a carrier, payload, or sensing module.

The processing unit 1504 can be operatively coupled to a communication module 1510 configured to transmit and/or receive data from one or more external devices (e.g., a terminal, display device, or other remote controller). Any suitable means of communication can be used, such as wired communication or wireless communication. For example, the communication module 1510 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1510 can transmit and/or receive one or more of sensing data from the sensing module 1502, processing results produced by the processing unit 1504, predetermined control data, user commands from a terminal or remote controller, and the like.

The components of the system 1500 can be arranged in any suitable configuration. For example, one or more of the components of the system 1500 can be located on the movable object, carrier, payload, terminal, sensing system, or an additional external device in communication with one or more of the above. Additionally, although FIG. 15 depicts a single processing unit 1504 and a single non-transitory computer readable medium 1506, one of skill in the art would appreciate that this is not intended to be limiting, and that the system 1500 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1500 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An unmanned aerial vehicle (UAV) comprising:
   a vehicle body;
   one or more propulsion units coupled to the vehicle body and configured to effect movement of the UAV; and
   one or more processors coupled to the one or more propulsion units and individually or collectively configured to:
      receive one or more sets of altitude restrictions for the UAV;
      receive location information indicating a current location of the UAV;
      determine a priority of the one or more sets of altitude restrictions by which the UAV abides based on the location information;
      select a set from the one or more sets of altitude restrictions based on the determined priority; and
      generate control signals to control the one or more propulsion units such that the UAV is operated in compliance with the selected set of altitude restrictions.

2. The UAV of claim 1, wherein the one or more sets of altitude restrictions are received from one or more different data sources stored onboard or off-board the UAV.

3. The UAV of claim 2, wherein the one or more sets of different data sources comprise at least one of a user input, a manufacturer database, or a government database.

4. The UAV of claim 1, wherein the one or more sets of altitude restrictions are received prior to or during flight of the UAV.

5. The UAV of claim 1, wherein the one or more processors are further configured to:
   receive elevation or map information for an area around the current location of the UAV; and
   modify the selected set of altitude restrictions using the elevation or map information.

6. The UAV of claim 5, wherein the selected set of altitude restrictions comprises at least one of a maximum altitude limit or a minimum altitude limit.

7. The UAV of claim 6, wherein modifying the selected set of altitude restrictions comprises increasing or decreasing the maximum altitude limit or the minimum altitude limit.

8. The UAV of claim 1, wherein the one or more processors are further configured to:
   receive altitude information from an altitude sensor coupled to the UAV; and
   generate a comparison result by comparing the altitude information with the selected set of altitude restrictions to determine whether the UAV is operated in compliance with the selected set of altitude restrictions.

9. The UAV of claim 8, wherein the control signals are generated according to the comparison result to cause the UAV to effect one or more flight response measures.

10. The UAV of claim 9, wherein the one or more flight response measures comprise at least one of:
    automatic ascending or descending of the UAV;
    automatic landing of the UAV; or
    providing an alert or warning to the UAV or an external device operated by a user to control the UAV.

11. A system for controlling an aerial vehicle, comprising:
    one or more processors individually or collectively configured to:
       receive one or more sets of altitude restrictions for the aerial vehicle;
       receive location information indicating a current location of the aerial vehicle;
       determine a priority of the one or more sets of altitude restrictions by which the aerial vehicle abides based on the location information;
       select a set from the one or more sets of altitude restrictions based on the determined priority; and
       generate control signals to control one or more propulsion units of the aerial vehicle such that the aerial vehicle is operated in compliance with the selected set of altitude restrictions.

12. The system of claim 11, wherein the one or more processors are further configured to:
    receive elevation or map information for an area around the current location of the aerial vehicle; and
    modify the selected set of altitude restrictions using the elevation or map information.

13. The system of claim 11, wherein the one or more processors are further configured to:
    receive altitude information from an altitude sensor coupled to the aerial vehicle; and
    generate a comparison result by comparing the altitude information with the selected set of altitude restrictions to determine whether the aerial vehicle is operated in compliance with the selected set of altitude restrictions, wherein the control signals are generated according to the comparison result to cause the aerial vehicle to effect one or more flight response measures.

14. The system of claim 13, wherein the one or more flight response measures comprise at least one of:
    automatic ascending or descending of the aerial vehicle;
    automatic landing of the aerial vehicle; or
    providing an alert or warning to the aerial vehicle or an external device operated by a user to control the aerial vehicle.

15. The system of claim 14, wherein the alert or warning comprises at least one of a visual alert, an audio alert, or a tactile alert.

16. A method of controlling an unmanned aerial vehicle (UAV), comprising:
    receiving, through one or more processors, one or more sets of altitude restrictions for the UAV, the UAV comprising a vehicle body, one or more propulsion units coupled to the vehicle body and configured to effect movement of the UAV, and the one or more processors coupled to the one or more propulsion units;
    receiving, through the one or more processors, location information indicating a current location of the UAV;

determining, through the one or more processors, a priority of the one or more sets of altitude restrictions by which the UAV abides based on the location information;

selecting, through the one or more processors, a set from the one or more sets of altitude restrictions based on the determined priority; and generating, through the one or more processors, control signals to control the one or more propulsion units such that the UAV is operated in compliance with the selected set of altitude restrictions.

17. The method of claim 16, further comprising:

receiving elevation or map information for an area around the current location of the UAV; and modifying the selected set of altitude restrictions using the elevation or map information.

18. The method of claim 17, wherein the selected set of altitude restrictions comprises at least one of a maximum altitude limit or a minimum altitude limit, and modifying the selected set of altitude restrictions comprises increasing or decreasing the maximum altitude limit or the minimum altitude limit.

19. The method of claim 16, further comprising:

receiving altitude information from an altitude sensor coupled to the UAV; and generating a comparison result by comparing the altitude information with the selected set of altitude restrictions to determine whether the UAV is operated in compliance with the selected set of altitude restrictions, wherein the control signals are generated according to the comparison result to cause the UAV to effect one or more flight response measures.

20. The method of claim 19, wherein the one or more flight response measures comprise at least one of:

automatic ascending or descending of the UAV;

automatic landing of the UAV; or providing an alert or warning to the UAV or an external device operated by a user to control the UAV.

* * * * *